US009322939B2

(12) United States Patent
Levene et al.

(10) Patent No.: US 9,322,939 B2
(45) Date of Patent: Apr. 26, 2016

(54) IMAGING MEASUREMENT SYSTEM WITH A PRINTED PHOTODETECTOR ARRAY

(75) Inventors: Simha Levene, D.N. Hanegev (IL); Ami Altman, Tel Aviv (IL); Naor Wainer, Zichron Yaakov (IL); Cornelis Reinder Ronda, Aachen (DE); Eliav Itshak Haskal, Eindhoven (NL); Dagobert Michel De Leeuw, Eersel (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 338 days.

(21) Appl. No.: 13/390,529

(22) PCT Filed: Aug. 5, 2010

(86) PCT No.: PCT/IB2010/053557
§ 371 (c)(1),
(2), (4) Date: Feb. 15, 2012

(87) PCT Pub. No.: WO2011/030240
PCT Pub. Date: Mar. 17, 2011

(65) Prior Publication Data
US 2012/0153163 A1 Jun. 21, 2012

Related U.S. Application Data

(60) Provisional application No. 61/240,443, filed on Sep. 8, 2009.

(51) Int. Cl.
*G01T 1/24* (2006.01)
*G01T 1/29* (2006.01)
*G01T 1/20* (2006.01)

(52) U.S. Cl.
CPC ............. *G01T 1/2985* (2013.01); *G01T 1/2018* (2013.01); *G01T 1/242* (2013.01); *G01T 1/249* (2013.01)

(58) Field of Classification Search
CPC ..... G01T 1/2018; G01T 1/202; G01T 1/2985; G01T 1/242; G01T 1/249; G01T 1/16; G01T 1/20; H01L 27/14601; H01L 31/0322; H01L 27/14658
See application file for complete search history.

(56) References Cited

U.S. PATENT DOCUMENTS 5,138,167 A 8/1992 Barnes
5,933,168 A 8/1999 Sakai
(Continued)

FOREIGN PATENT DOCUMENTS

JP 1126584 A 5/1989
WO 03/077318 9/2003
(Continued)

OTHER PUBLICATIONS

Yahaya et al., "Fabrication of Photodiode by Screen Printing Technique," ICSE'98 Proc. Nov. 1998, Bangi, Malaysia, p. 254-259. Retrieved from internet [Mar. 9, 2014]; Retrieved from url <http://ieeexplore.ieee.org/xpls/abs_all.jsp?arnumber=781191&tag=1>.*
(Continued)

*Primary Examiner* — Yara B Green

(57) ABSTRACT

Low cost large area photodetector arrays are provided. In a first embodiment, the photodetectors comprise an inorganic photoelectric conversion material formed in a single thick layer of material. In a second embodiment, the photodetectors comprise a lamination of several thin layers of an inorganic photoelectric conversion material, the combined thickness of which is large enough to absorb incoming x-rays with a high detector quantum efficiency. In a third embodiment, the photodetectors comprise a lamination of several layers of inorganic or organic photoelectric conversion material, wherein each layer has a composite scintillator coating.

37 Claims, 18 Drawing Sheets

(56) References Cited

U.S. PATENT DOCUMENTS

| | | | |
|---|---|---|---|
| 6,462,344 B1* | 10/2002 | Joo et al. | 250/370.09 |
| 6,717,152 B2 | 4/2004 | Izumi | |
| 6,898,265 B1* | 5/2005 | Mliner et al. | 378/19 |
| 6,982,424 B2 | 1/2006 | Vafi et al. | |
| 7,010,088 B2 | 3/2006 | Narayanaswamy et al. | |
| 7,230,247 B2 | 6/2007 | Shibayama | |
| 7,276,749 B2 | 10/2007 | Martin et al. | |
| 7,479,640 B2 | 1/2009 | Misawa | |
| 7,582,506 B2 | 9/2009 | Basol | |
| 2003/0031296 A1 | 2/2003 | Hoheisel | |
| 2003/0200655 A1 | 10/2003 | Vafi et al. | |
| 2004/0016886 A1 | 1/2004 | Ringermacher et al. | |
| 2005/0018810 A1* | 1/2005 | Narayanaswamy et al. | 378/91 |
| 2005/0104000 A1* | 5/2005 | Kindem et al. | 250/361 R |
| 2005/0113682 A1* | 5/2005 | Webber et al. | 600/426 |
| 2006/0153985 A1 | 7/2006 | Roscheisen et al. | |
| 2007/0075253 A1 | 4/2007 | Misawa | |
| 2007/0163639 A1 | 7/2007 | Robinson et al. | |
| 2007/0163644 A1 | 7/2007 | Van Duren et al. | |
| 2007/0166453 A1 | 7/2007 | Van Duren et al. | |
| 2008/0210877 A1* | 9/2008 | Altman et al. | 250/366 |
| 2008/0237470 A1 | 10/2008 | Loureiro et al. | |
| 2009/0218650 A1 | 9/2009 | Lee | |
| 2010/0193695 A1 | 8/2010 | Yeow et al. | |
| 2010/0220833 A1* | 9/2010 | Levene et al. | 378/19 |

FOREIGN PATENT DOCUMENTS

| | | |
|---|---|---|
| WO | 2008033508 A2 | 3/2008 |
| WO | 2009/062311 | 5/2009 |
| WO | 2009083852 A2 | 7/2009 |

OTHER PUBLICATIONS

Matsushima, O., et al.; A High-sensitivity Broadband Image Sensor using CuInCaSe2 Thin Films; 2008; IEEE Trans. on International Electron Devices Meeting; 4 pages.

* cited by examiner

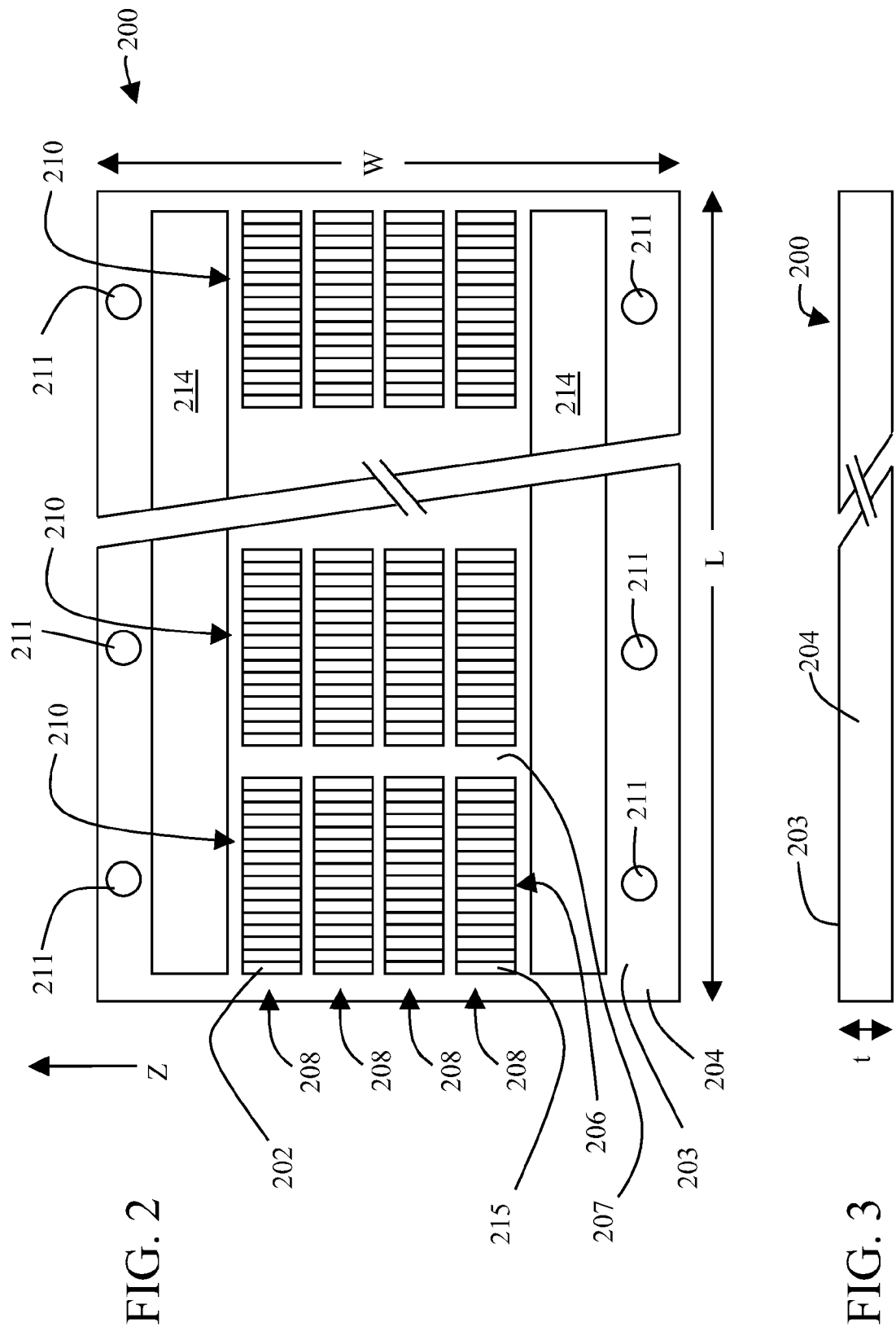

IMAGING MEASUREMENT SYSTEM WITH A PRINTED PHOTODETECTOR ARRAY

CROSS REFERENCE TO RELATED APPLICATIONS

This application claims the benefit of U.S. provisional application Ser. No. 61/240,443 filed Sep. 8, 2009, which is incorporated herein by reference.

The present application relates generally to the imaging arts, and in particular a data measurement system useful for CT and other imaging modalities. These imaging modalities are useful in many contexts, such as medical imaging, security imaging for example baggage scanning, and other contexts.

One challenge posed by previously known CT imaging systems is connecting, both mechanically and electrically, the x-ray detectors to the rest of the system. Indeed, a substantial part of the cost of known CT data measurement systems arises from the connectors which enable each detector array to be plugged in to the data measurement system and be mechanically mounted upon it with high spatial and electrical precision. Good image quality in CT imaging usually requires that the dixels (detector pixels) in each array be mounted precisely with reference to each other, to the x-ray tube focal spot, and to the cradle. In addition, previously known CT imaging systems include large numbers of precision components to form scintillator assemblies, which are also costly to make and assemble into the overall system.

The present invention achieves the requisite precision at a low cost by using large area x-ray photodetector arrays. In a first embodiment, the x-ray photodetectors comprise an inorganic direct photoelectric conversion material formed in a single thick layer of material. In a second embodiment, the x-ray photodetectors comprise a lamination of several thin layers of an inorganic photoelectric conversion material, the combined thickness of which is large enough to absorb incoming x-rays with a high detector quantum efficiency. In a third embodiment, the x-ray photodetectors comprise a lamination of several layers of inorganic or organic photodiodes, wherein each layer has a composite scintillator coating thin enough that the coating's self-absorption and scattering does not materially reduce the light output of the scintillator coating, despite a potentially large difference in refractive index between the scintillator powder and the resin in which it is dispersed to form the composite.

These designs substantially reduce the cost and complexity of the overall data measurement system. The proposed systems also lend themselves to duplication in layers to form a multi-layer spectral CT data measurement system such as a two layer spectral CT system. Thus, large area photodetector arrays forming a data measurement system in a CT or other imaging apparatus are very beneficial. The present invention further concerns various structures and geometries for using large area photodetector arrays in a CT scanner or other imaging scanner data measurement system.

According to one aspect of the present invention, an imaging system is provided including a radiation source which rotates around a central z-axis of the imaging system to perform imaging scans, and a printed inorganic x-ray photodetector array including several discrete photodetectors printed in rows and columns on a support that is curved, such that each row of photodetectors is aligned along the curve of the curved support, and each column of photodetectors is aligned in parallel to the central z-axis of the imaging system. The inorganic x-ray photodetectors may comprise for example CIGS, $AuInGaSe_2$, or $AuInThSe_2$. Each photodetector forms one of the dixels of a detector array. The detector array may include two or more layers, each comprising a printed inorganic x-ray photodetector array, for use as a spectral CT imaging system.

According to another aspect of the present invention, a bendable printed inorganic x-ray photodetector array assembly for use in an imaging system is provided, including a bendable support. The bendable support may be, for example, a PET sheet, a polyimide sheet, a PEET sheet, or a nylon sheet. The array assembly is mountable within a cradle, such that each photodetector forms a dixel, as an image data measurement system in an imaging apparatus. The detector array may include two or more layers for use as a spectral CT imaging system. Related methods of making such arrays are also provided.

In a third embodiment, the x-ray photodetectors comprise a lamination of several layers of inorganic or organic photodiodes, wherein each layer has a composite scintillator coating thin enough that the coating's self-absorption and scattering does not materially reduce the light output of the scintillator coating, despite a potentially large difference in refractive index between the scintillator powder and the resin in which it is dispersed to form the composite.

Numerous advantages and benefits will become apparent to those of ordinary skill in the art upon reading the following detailed description of preferred embodiments. The invention may take form in various components and arrangements of components, and in various process operations and arrangements of process operations. The drawings are only for the purpose of illustrating preferred embodiments and are not to be construed as limiting the invention.

FIGS. 2 and 3 are respectively a front view and a side view of an inorganic photodetector detector array 200;

Figure 15:
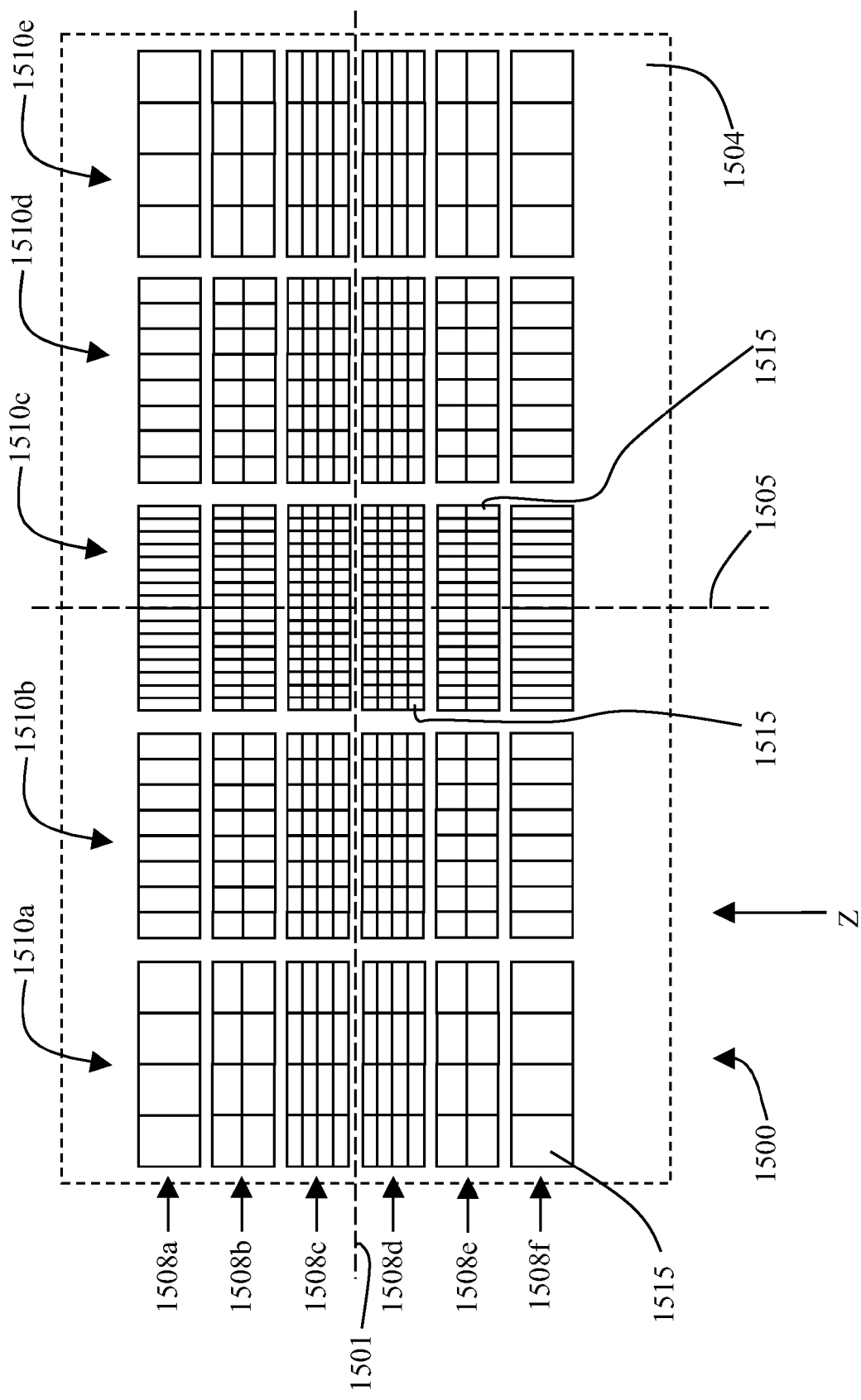
Figure 16:
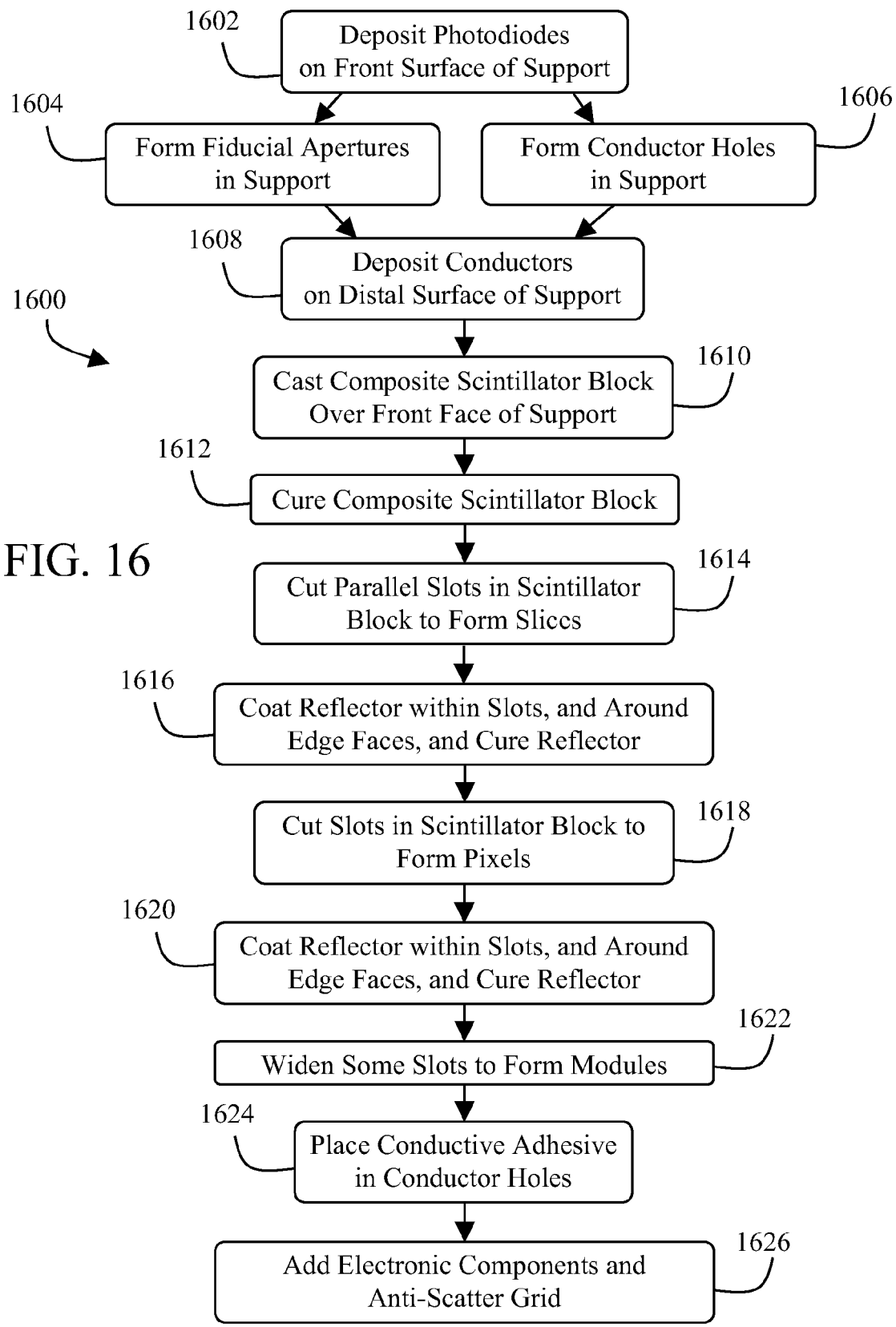
Figure 17:
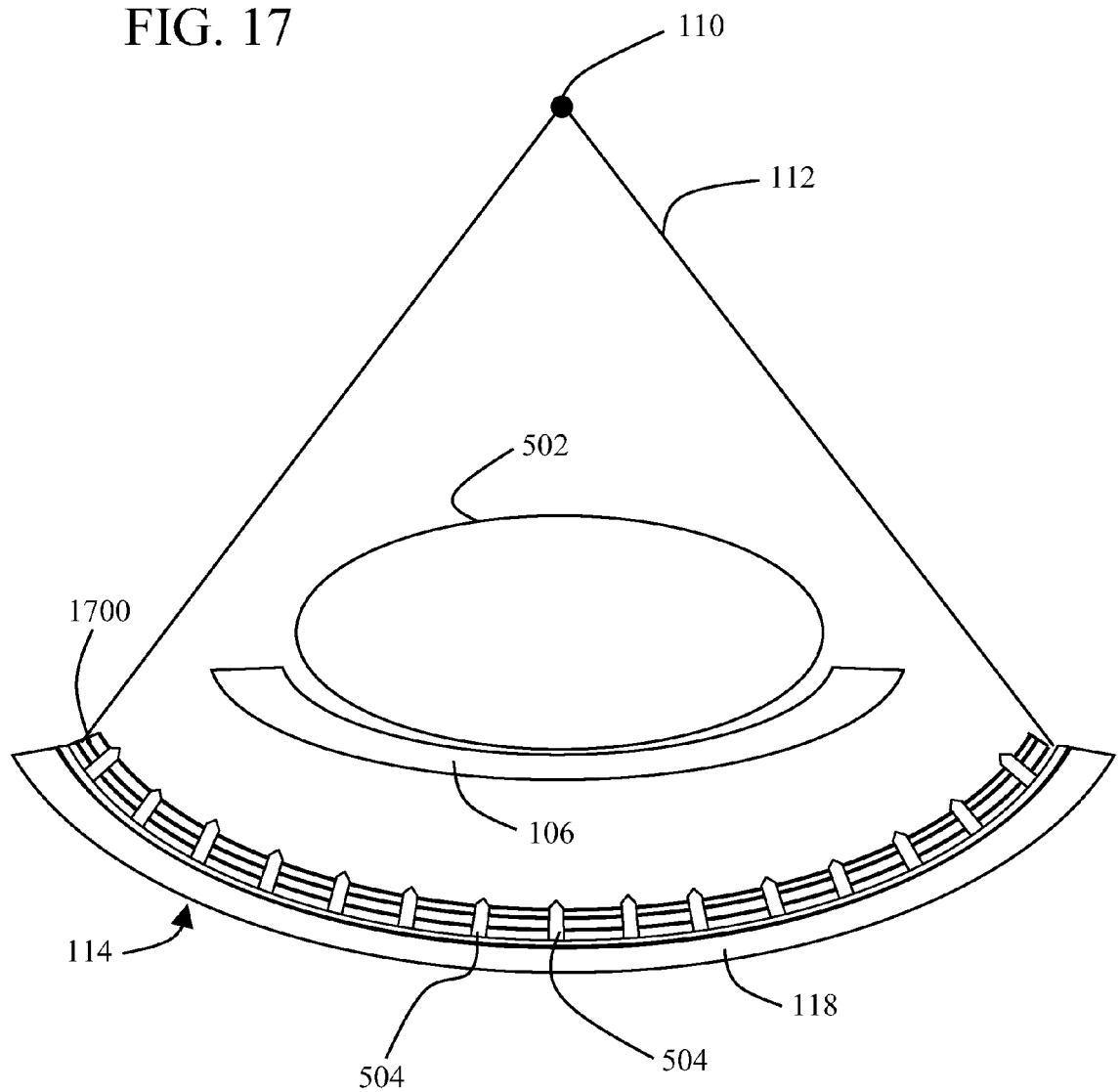
Figure 18:
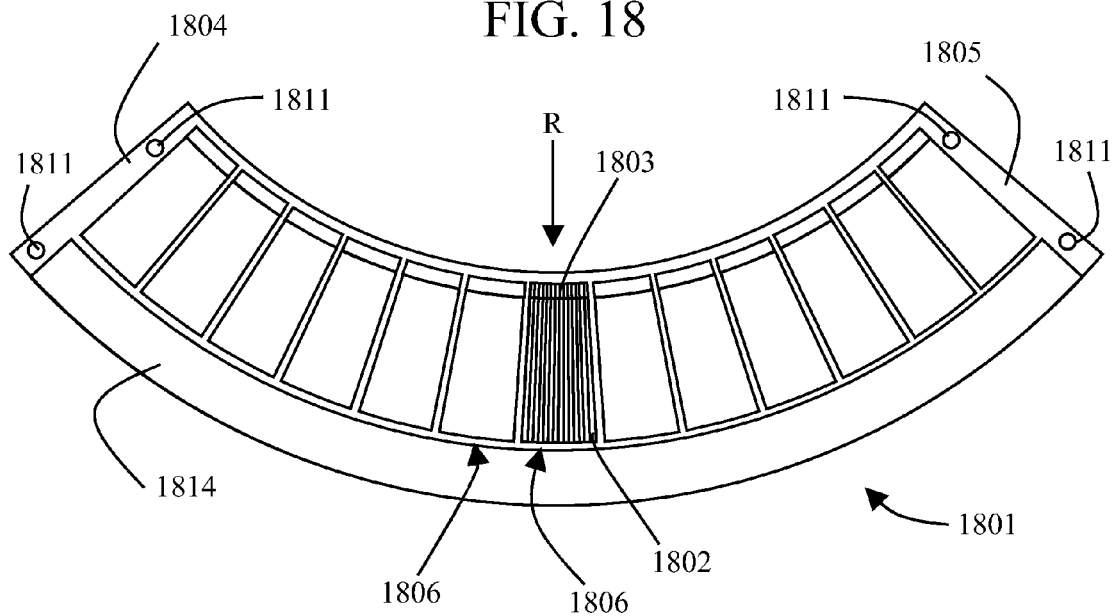
Figure 19:
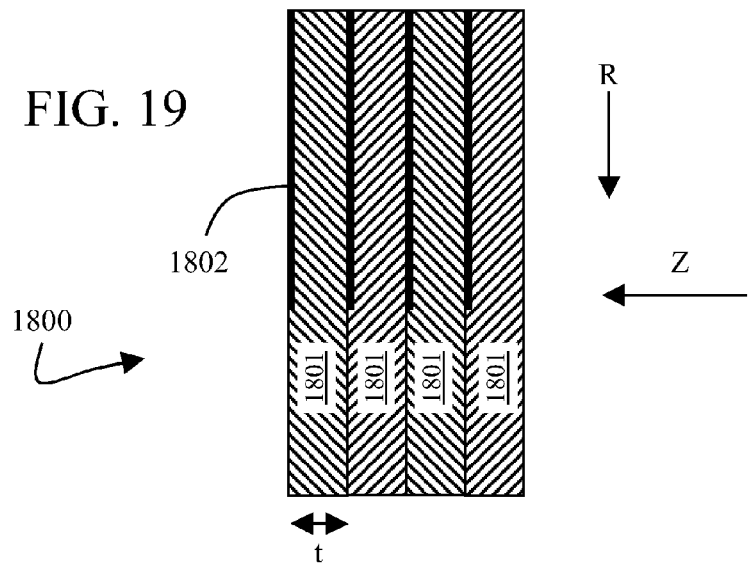
Figure 20:
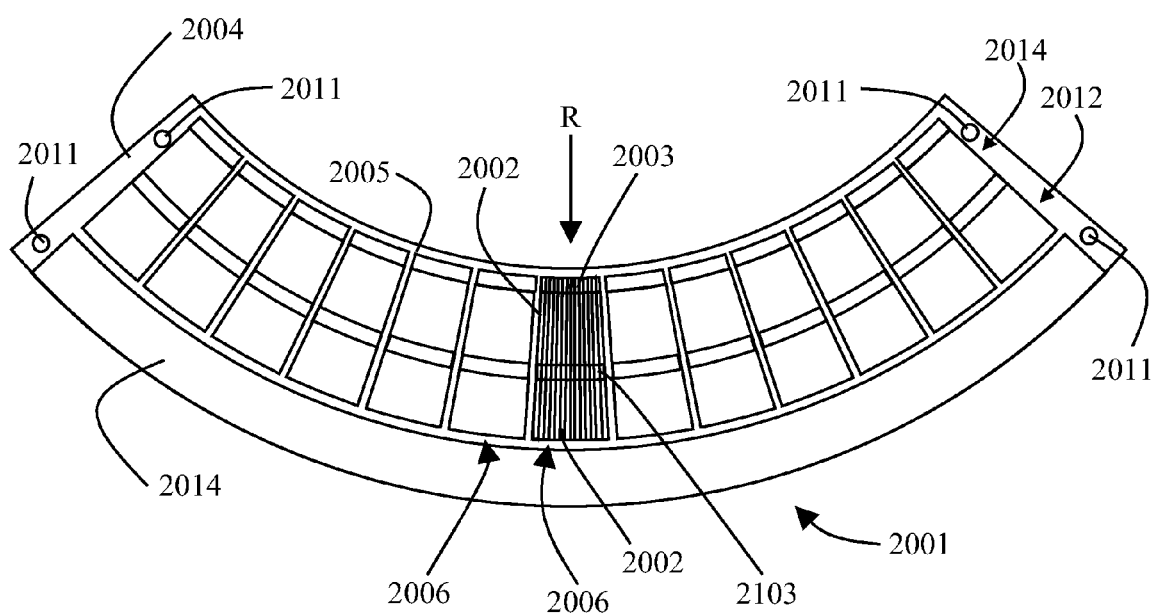
Figure 21:
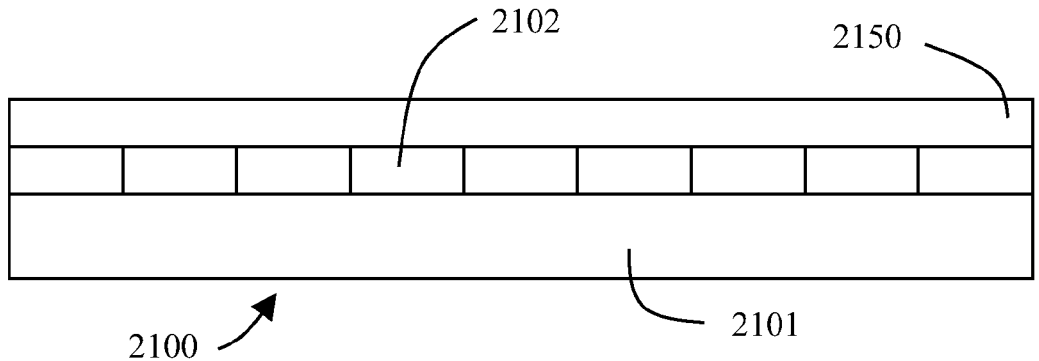
Figure 22:
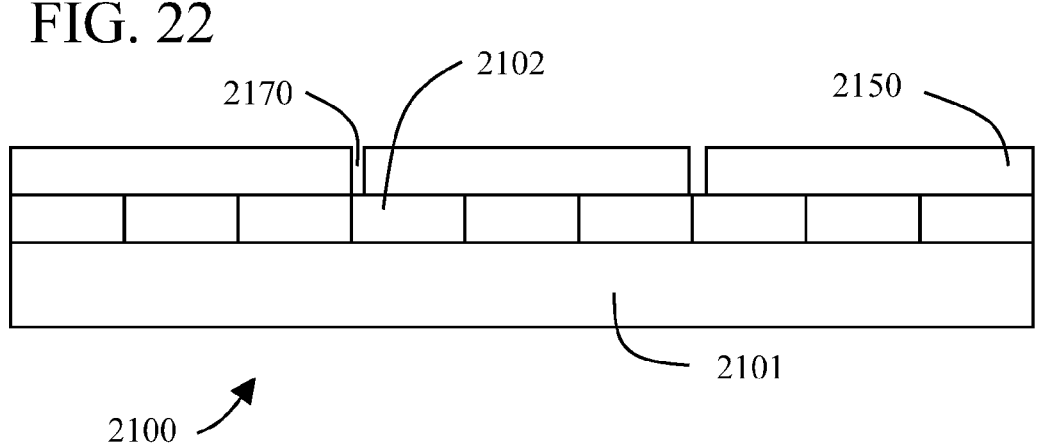
Figure 23:
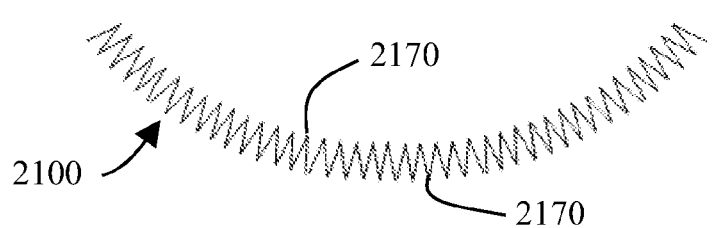

FIG. 15 schematically shows a photodetector array 1500 having dixels of varying sizes;

FIG. 16 illustrates a process 1600 of manufacturing and assembling an inorganic photodetector detector array, using a composite scintillator;

FIG. 17 is a schematic transaxial view of a CT imaging system incorporating a detector measurement system having laminated photodetector arrays with composite scintillators;

FIG. 18 is a schematic trans-axial view of a sectorial-shaped imaging element 1801 using an inorganic photodetector array with composite scintillators;

FIG. 19 is a schematic cross-sectional side view of an inorganic detector array 1900 incorporating several sectorial-shaped elements 1801;

FIG. 20 is a schematic trans-axial view of a sectorial-shaped imaging element 2000 using an inorganic photodetector array appropriate for a spectral CT apparatus; and FIGS. 21 through 23 shows an array 2100 of photodetectors suitable for use to be tilted at an angle to the x-ray beam.

CT IMAGING APPARATUS

Figure 1:
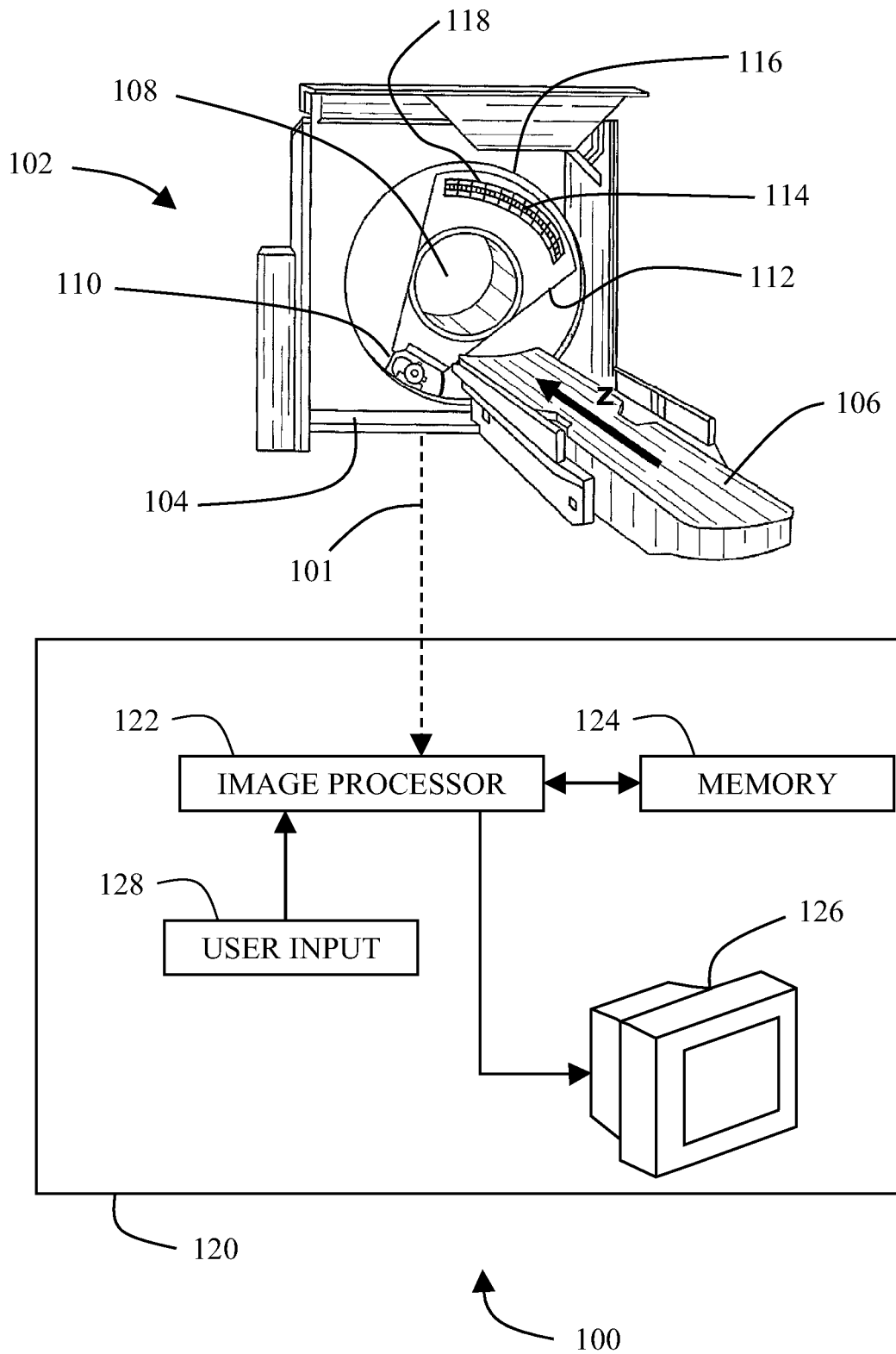
FIG. 1 illustrates a CT imaging apparatus 100.

FIG. 1 illustrates one example of a CT imaging apparatus 100 for performing an imaging scan. A CT imaging acquisition system 102 includes a gantry 104 and a table 106 which moves along the z-axis. A patient or other object to be imaged (not shown) lies down on the table 106 and is moved to be disposed within an aperture 108 in the gantry 104. Once the patient or object is in position, an x-ray source 110 emits a projection of x-rays 112 to be gathered by an x-ray data measurement system 114 inside the gantry 104. (A portion 116 of the gantry 104 is cut away in FIG. 1 to show the x-ray source 110 and x-ray data measurement system 114 which are housed inside the gantry 104.) The data measurement system 114 includes several photodetectors (not shown) disposed on a cradle 118. The x-ray source 110 and data measurement system 114 rotate together around the aperture 108 to record CT imaging data from various positions, often in conjunction with linear movement of the table 106. This rotation is possible because the x-ray source 110 and the cradle 118 are each mounted to a common rotor (not shown) inside the gantry 104.

The CT imaging acquisition system 102 then passes the CT imaging data on to a CT imaging, processing and display system 120 through a communication link 101. Although the systems 102 and 120 are shown and described here as being separate systems for purposes of illustration, they may in other embodiments be part of a single system. The CT imaging data passes to an image processor 122 which stores the data in a memory 124. The image processor 122 electronically processes the CT imaging data to generate images of the imaged patient or other object. The image processor 122 can show the resulting images on an associated display 126. A user input 128 such as a keyboard and/or mouse device may be provided for a user to control the processor 122.

CT Data Measurement Systems (Four Slices)

As shown in FIGS. 2 and 3, one data measurement system described herein includes an inorganic photodetector detector array 200 which may be a printed inorganic photodetector array. The array 200 is composed of several, preferably inorganic photodetectors 202 printed on the front surface 203 of a support 204, each of which forms an imaging dixel 215 of the array 200. The inorganic photodetectors 202 as shown in FIG. 2 are rectangular in shape, although any shape may be used, and the size of the photodetectors is preferably on the order of approximately 0.5 to 5 mm by 0.5 to 5 mm, and most preferably approximately 1 mm by 1 mm. The inorganic photodetectors 202 may be arranged in groups 206 of photodetectors 202, with for example sixteen photodetectors 202 in each group 206. There may be a gap 207 between each adjacent group 206 of photodetectors 202, in order to facilitate proper alignment of the photodetectors 202 in a curved configuration as described below. Although not shown in FIGS. 2 and 3, there may be a gap in between any two adjacent photodetectors 202 in a given group 206, resulting in a pitch in each direction of approximately 1.2 mm. The groups 206 are arranged in for example four rows 208 and forty-two columns 210, although only three columns 210 are shown in FIG. 2, for a total of 2,688 photodetectors 202 in the array 200. Thus the inorganic photodetector detector array 200 will typically be approximately 75 to 100 cm in length L, approximately 15 cm in width W, and approximately 100 μm in thickness t. Such an array 200 is useful for a four slice CT imaging system, wherein each of the four rows 208 represents an imaging slice. Thus, the array 200 is disposed within a CT imaging apparatus 100 so that the z-axis is oriented as shown in FIG. 2. This arrangement of inorganic photodetectors 202 in an array 200 is merely representative; any other arrangement may be used as well to suit the needs of a particular application.

The support 204 of the inorganic photodetector array 200 is preferably a stable yet bendable plastic sheet. The support 204 may be, for example, a polyethylene terephthalate (PET) sheet, a polyimide sheet, a polyaryletheretherketone (PEEK) sheet, or a nylon sheet. Several fiducial apertures 211 are placed along each side of the support 204.

The inorganic photodetectors 202 may be deposited on the support 204, for example, by a printing process. As an exemplary embodiment, U.S. Patent Application Publication No. 2007/0163639 to Robinson et al. discloses a method and device for fabricating photovoltaic cells incorporating inorganic semiconductor films based on Group 11 (old style IB), Group 13 (old style IIIA) and/or Group 16 (old style VIA) compounds, and is incorporated herein by reference for that disclosure. In summary, the Robinson '639 method begins with a dispersion material which includes at least one element from Group 11, 13 and/or 16. Among other advantages, use of Group 16 or chalcogenic compounds results in a low melting point, which is an advantage over more traditional Si-based dispersion materials. However, in connection with the present invention, the dispersion material may use any element from Groups 11, 13 and/or 16. In one preferred embodiment, CIGS (copper indium gallium di-selenide) is used to form the dispersion material. In another preferred embodiment, a gold-based semi-conductor such as $AuInGaSe_2$ or $AuInThSe_2$ could be used, for example.

According to the Robinson '639 method, the dispersion material is coated on to a substrate to form a precursor layer, for example by a high throughput roll-to-roll printing process. The resulting precursor layer is in turn cured to form a thin but dense semiconductor film. The curing step may be accelerated by heating the precursor layer to a temperature greater than an annealing temperature of the precursor layer, but less than a melting temperature of the substrate. Use of a substrate of very high melting point such as PEEK enables hotter curing. The cured film is then used to form a semiconductor absorber for a photodetector device. For the direct detection of x-rays contemplated herein, the semi-conductor photodetector geometry and material composition should be chosen to optimize charge collection efficiency, with the electrodes at the peripheral surfaces of the semi-conductor diode, to maximize collection of the charge developed by conversion of the incoming x-rays for collection with a minimum of time delay.

The Robinson '639 printing method is but one example of an appropriate printing method; other suitable printing processes may be used as well. For a four slice array such as the array 200, such processes include other kinds of roll-to-roll printing, silk-screen printing, and spin coating printing of the inorganic photodetectors 202 at low resolution on the support 204. An ink jet printing process may also be employed to deposit the inorganic photodetectors 202 on the support 204, when higher definition is required, for example for smaller dixels.

The inorganic photodetectors 202 of the exemplary array 200 are direct detectors; that is, they directly harness incoming x-rays and produce an electrical signal indicative of the incoming x-rays. In alterative embodiments, the photodetectors may be indirect detectors; in those embodiments, scintillator elements are disposed on top of the photodetectors to convert incoming x-rays to another form of light, and that second form of light is then harnessed by the photodetectors to indirectly produce an electrical signal indicative of the incoming x-rays.

Figure 4:
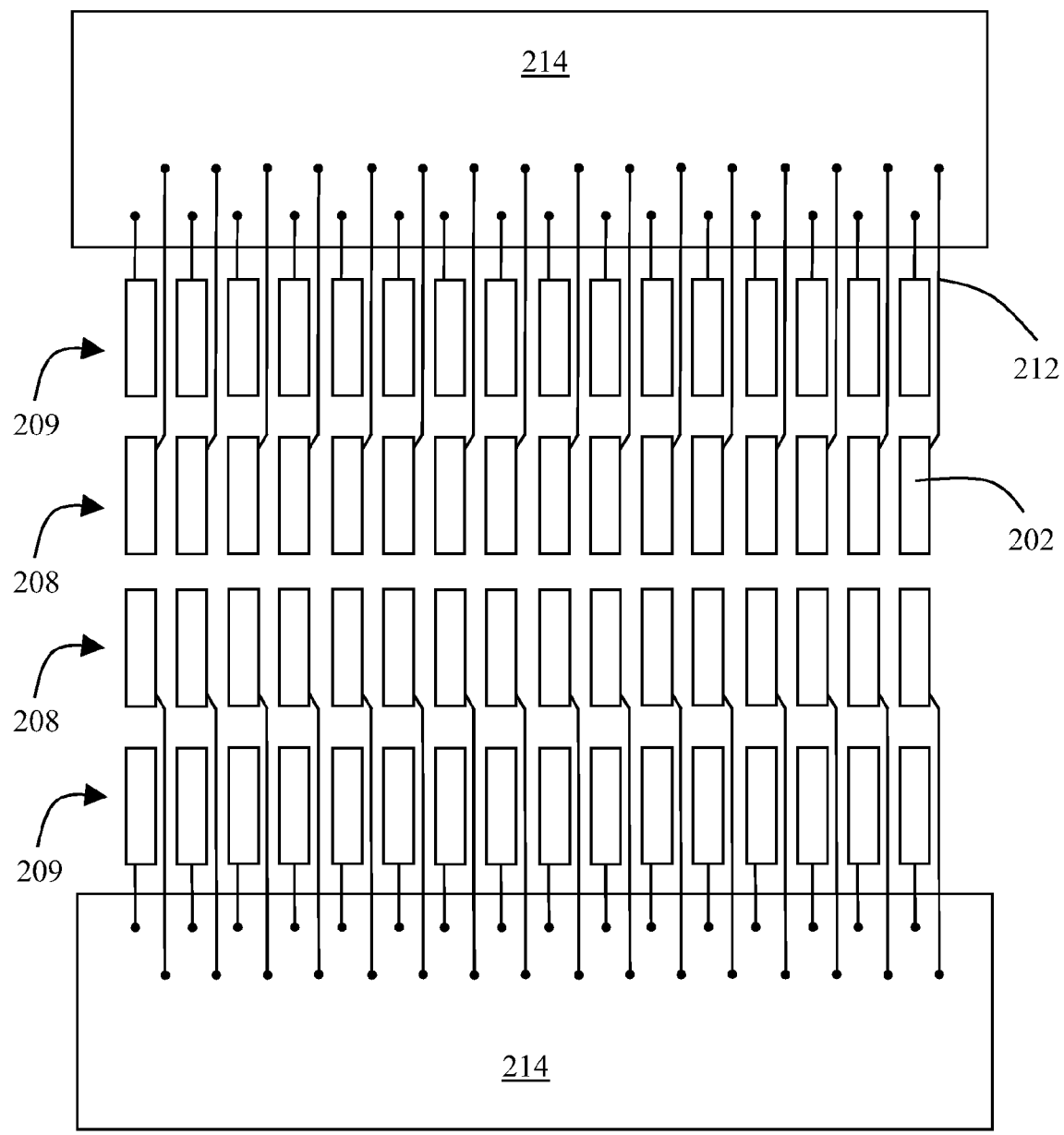
FIG. 4 is a close-up view of the front surface of the inorganic photodetector detector array 200.

As shown in FIG. 4, electrical conductors 212 on the front surface 203 of the support 204 lead from each inorganic photodetector 202 to a side of the array 200. FIG. 2 does not show the conductors 212 for the sake of clarity in that Figure. The conductors 212 for the inorganic photodetectors 202 in the two inner rows 208 may pass between two adjacent photodetectors 202 in the two outer rows 209. The conductors 212 connect the inorganic photodetectors 202 to "active" electronic components 214 mounted at each side of the array 200, such as for example amplifiers, analog-to-digital convertors, multiplexers, application-specific integrated circuits (ASICs), and the like, together with output connectors. The active electronic components 214 may be formed in approximately 5 cm wide margins along the sides. In this way, the conductors 212 may carry power to, and also carry output signals from, each inorganic photodetector 202. In addition, one electrode of each inorganic photodetector 202 is also connected to a ground, which may be a common ground, such as through a transparent conducting layer disposed above the photodetectors 202.

In an alternative embodiment, the photodetectors 202 may be formed by several stacked layers. In such embodiments, each layer of the photodetector 202 is first separately formed by disposing an inorganic material which is preferably at least about 100 μm thick on a support, and then curing it to form a semiconductor layer. The semiconductor layers are then stacked and laminated to form a semiconductor thick enough to efficiently absorb the x-radiation. This the CIGS layers are preferably stacked to a total thickness of approximately 3.5 mm. The thick semiconductor is then disposed on a base support, wherein the base support contains the electrical conductors 212 and "active" electronic components 214 to process the signal from the thick stacked semiconductor.

Figure 5:
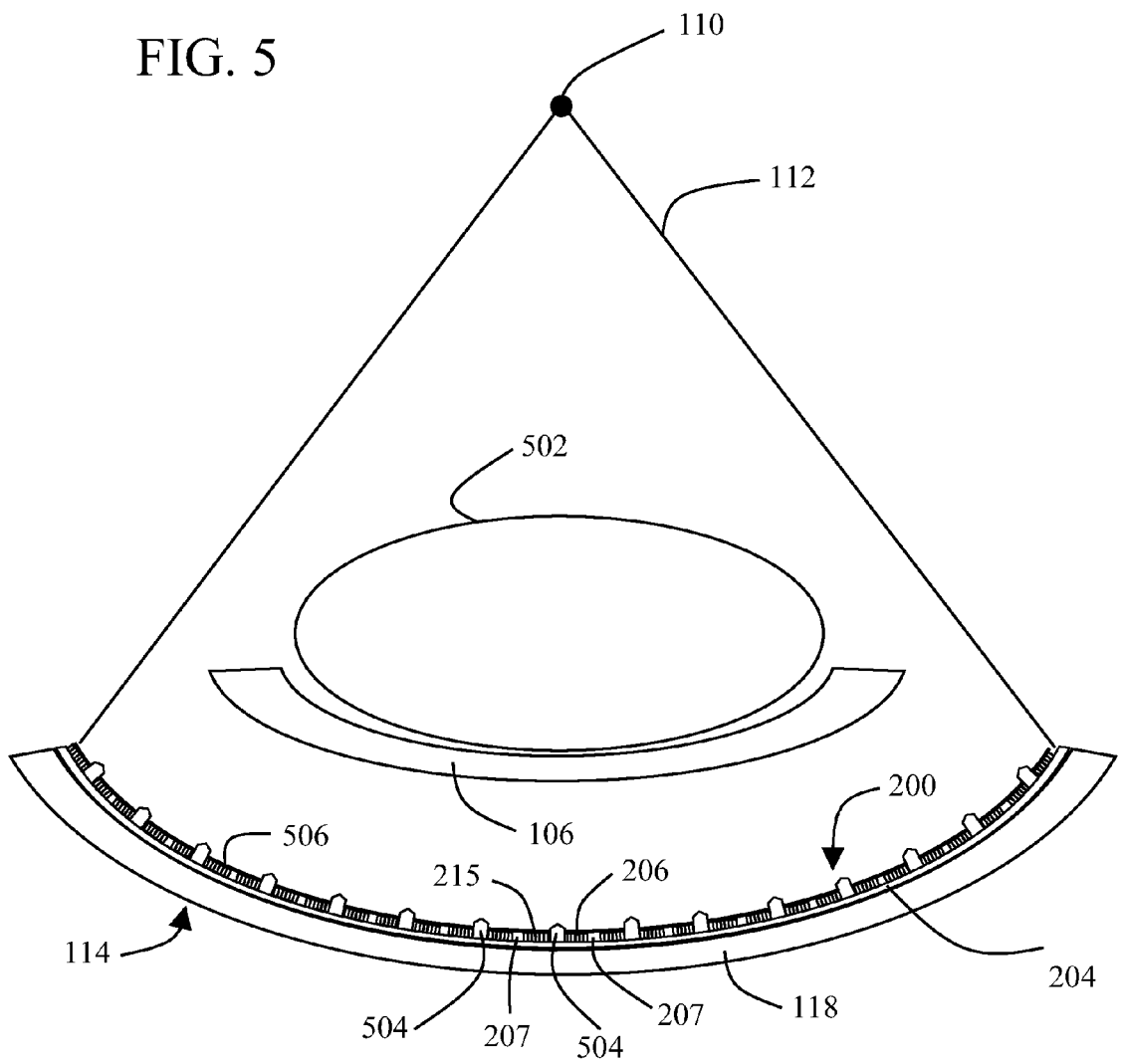
FIG. 5 is a schematic trans-axial view of the inorganic photodetector detector array 200 disposed within the CT imaging apparatus 100.

As shown in FIG. 5, once the inorganic photodetector array 200 has been assembled to form dixels 215, it may be inserted into a cradle 118 for use as a data measurement system 114 in a CT imaging apparatus such as the apparatus 100 described above. Thus, FIG. 5 schematically illustrates the inter-relationships between the x-ray source 110 which produces the x-ray projections 112, the patient or object 502 to be imaged lying on a table 106, and the inorganic photodetector array 200. The cradle 118 may include fiducial pins 504, which extend through the fiducial apertures 211 in the support 204 of the array 200 in order to properly align the array 200 within the cradle 118 and, therefore, within the entire apparatus 100. The pins 504 may additionally be used to properly align one or more anti-scatter grids (not shown) above the array 200. The array 200 may additionally or solely be held in place on the cradle 118 with a suitable adhesive. The array 200 and cradle 118 together make up a data measurement system 114. The size of the dixels 215, in relation to the size of the other components in the apparatus, has been greatly exaggerated in FIG. 5 for purposes of illustration. As already mentioned, in an actual data measurement system 114, there might be approximately forty-two groups 206 of dixels 215 spanning the arc length of the data measurement system 114 instead of the fifteen groups 206 shown in the Figure. A layer 506 of plastic, such as polytetrafluoroethylene (PTFE) loaded with $TiO_2$, may be placed over the inside surface of the arc of the array 200. This layer 506 adds strength to the array 200.

Figure 6:
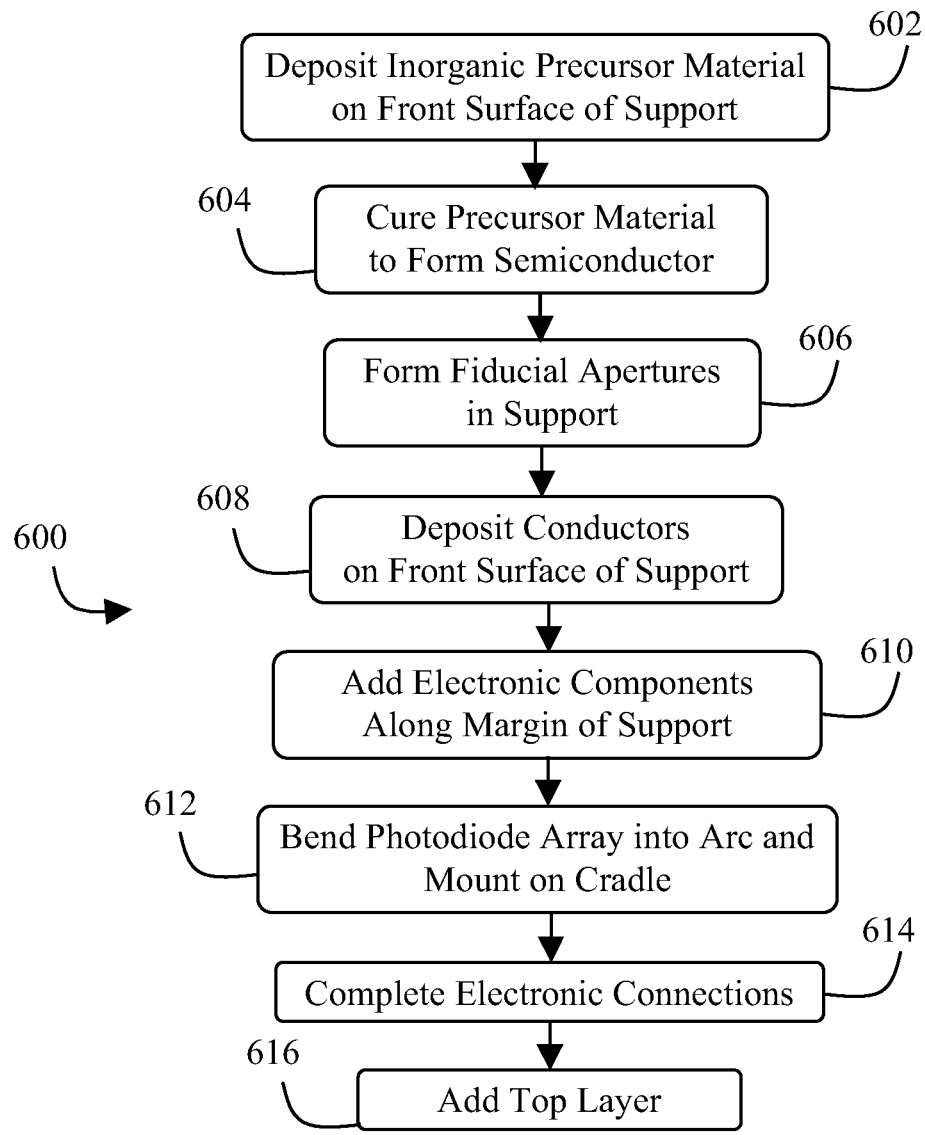
FIG. 6 illustrates a process 600 of manufacturing and assembling the inorganic photodetector detector array 200.

An inorganic photodetector detector array 200 may be manufactured, and assembled within a data measurement system, according to the process 600 illustrated in FIG. 6. The ordering of the steps of the process 600 as shown in FIG. 6 may be changed to suit the needs of a particular application, and some steps may be added or removed from the exemplary process 600 shown and described here.

The inorganic precursor material is first deposited 602 on a front surface 203 of the support 204 in a photodetector 202 array 200. This deposition may be achieved, for example, by a printing process whereby the inorganic material making up the photodetectors 202 is printed on to the support 204, as already described. Depending on the size and application of the photodetector array 200, suitable printing processes might include roll-to-roll printing, silk-screen printing, spin coating printing, and ink jet printing. The inorganic material may also be deposited from solution and photo-etched to form patterns.

The array 200 is then heated and cured 604 to form a thin but dense film of semiconductor.

Fiducial apertures 211 are formed 606 in the support 204.

Electrical conductors 212 are deposited 608 on the front surface 203 of the support 204, with one conductor 212 leading from each inorganic photodetector 202 to a side of the array 200. The conductors 212, like the photodetectors 202 themselves, may be added with a printing process applied to the front surface 203 of the support 204 where the photodetectors 202 are located. Similarly, one electrode of each inorganic photodetector 202 is connected in common to ground, such as through a transparent conducting layer disposed above the photodetectors 202. Associated "active" electronic components 214 are added 610 at each side of the array 200, such as for example amplifiers, analog-to-digital convertors, multiplexers, application-specific integrated circuits (ASICs), and the like, together with output connectors.

The inorganic photodetector array 200 is bent 612 into an arc, to conform to the radius of a rigid cradle 118 centered on an x-ray source 110. The bent array 200 is mounted 612 to the cradle, such as with fiducial pins 504, and/or adhesive, or any other means to achieve the precise positioning required to properly focus the photodetectors 202 on the x-ray source 110.

The electronic connections are completed 614, and any further electronic components required to complete the assembly of the data measurement system are added. A layer 506 of white plastic, such as polytetrafluoroethylene (PTFE), may be added 616 over the inside surface of the arc of the array 200. This layer 506 adds strength to the array 200.

CT Data Measurement Systems (More than Four Slices)

Figure 7:
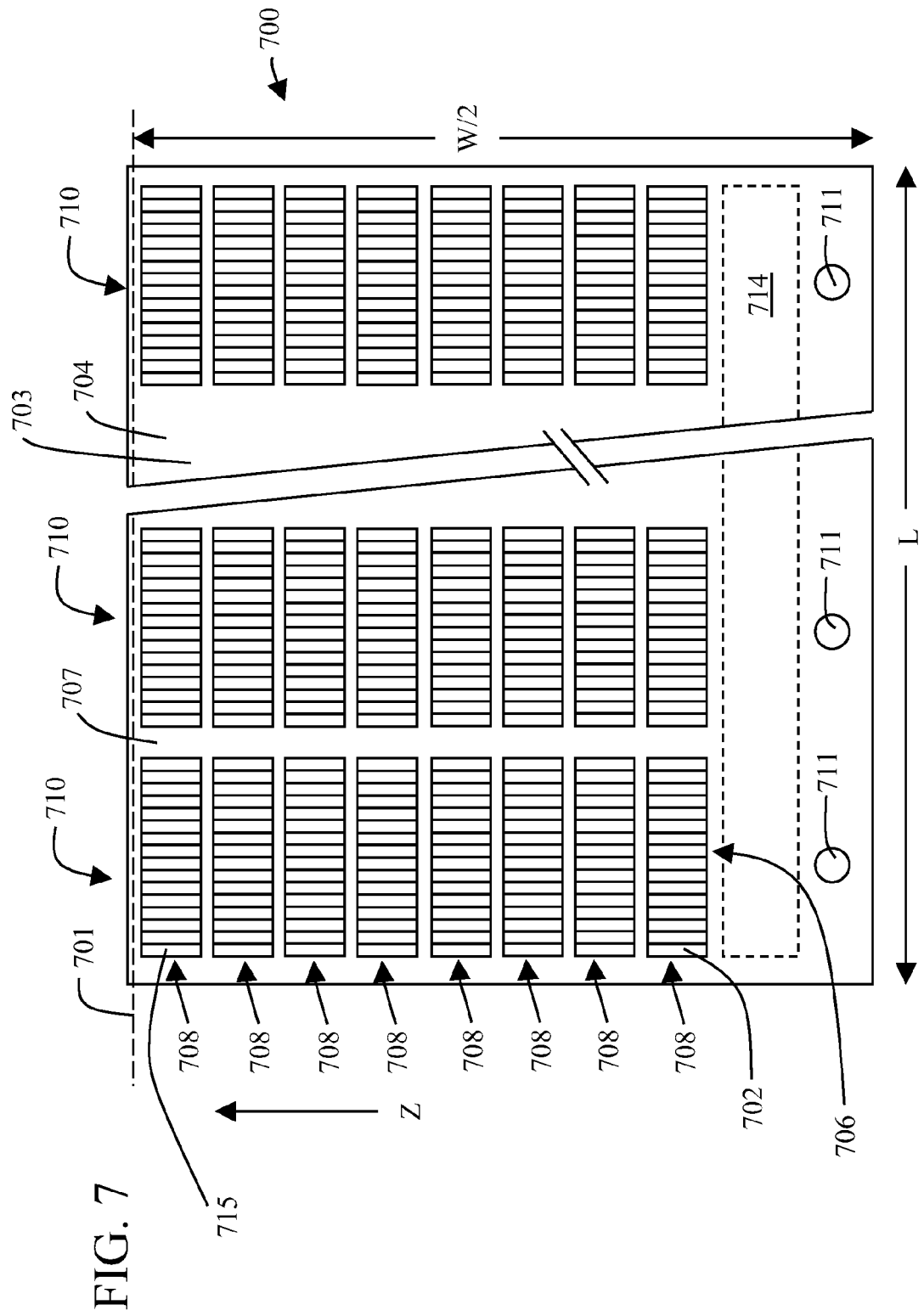
FIG. 7 is a partial front view of an inorganic photodetector detector array 700.
Figure 8:
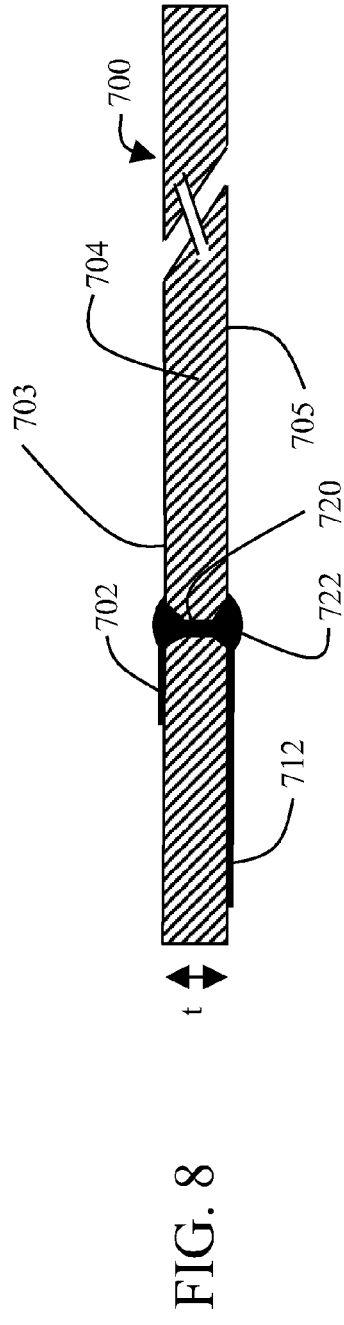
FIG. 8 is a cross-sectional side view of the inorganic photodetector detector array 700, taken along line 8-8 in FIG. 9.

The inorganic photodetector array 200 discussed above is suitable for a four slice CT imaging apparatus. Making such an array 200 for larger CT imaging systems, such as sixteen to sixty-four slices or one hundred twenty-eight slices, can be difficult. Enough room must be found on the front surface 203 of the array support 204 for both the photodetectors 202 and the conductors 212, without excessively reducing the active areas of the photodetectors 202 and reducing their sensitivity. To overcome such difficulties, an alternative inorganic photodetector detector array 700 is shown in FIGS. 7 and 8 which is more suitable to imaging systems with more than four slices. More particularly, half of such an array 700 on one side of a centerline 701 is shown in the Figures. The two halves of the array 700, one shown in the Figures and the other not shown, are symmetrical about the centerline 701.

Thus the array 700 is composed of several inorganic photodetectors 702 disposed on the front surface 703 of a support 704, each of which forms an imaging dixel 715 of the array 700. The inorganic photodetectors 702 as shown in FIG. 7 are rectangular in shape, although any other shapes such as hexagonal shapes may advantageously be used, and the size of the photodetectors is preferably on the order of approximately 0.5 to 5 mm by 0.5 to 5 mm, and most preferably approximately 1 mm by 1 mm. The inorganic photodetectors 702 may be arranged in groups 706 of photodetectors 702, with for example sixteen photodetectors 702 in each group 706. There may be a gap 707 between each adjacent group 706 of photodetectors 702, in order to facilitate proper alignment of the photodetectors 702 in a curved configuration as described below. The groups 706 are arranged in for example sixteen rows 708 and forty-two columns 710, although only three columns 710 are shown in FIG. 7. Thus the inorganic photodetector detector array 700 will typically be approximately 75 to 100 cm in length L, approximately 20 to 30 cm in width W, and approximately 100 μm in thickness t. Such an array 700 is useful for a sixteen slice CT imaging system, wherein each of the sixteen rows 708 represents an imaging slice. Thus, the array 700 is disposed within a CT imaging apparatus 100 so that the z-axis is oriented as shown in FIG. 7. This arrangement of inorganic photodetectors 702 in an array 700 is merely representative; any other arrangement may be used as well to suit the needs of a particular application.

Each photodetector 702 is composed of an inorganic material, as already discussed above in connection with the photodetectors 202 of the array 200. The inorganic photodetectors 702 may be deposited on the support 704, for example, by a printing process. Suitable printing processes include roll-to-roll printing, silk-screen printing, and spin coating printing of the inorganic photodetectors 702 at low resolution on the support 704. An ink jet printing process may also be employed to deposit the inorganic photodetectors 702 on the support 704. The inorganic material may also be deposited from solution and photo-etched to form patterns.

Also as in the array 200, the support 704 of the inorganic photodetector detector array 700 is preferably a stable yet bendable plastic sheet. The support 704 may be, for example, a polyethylene terephthalate (PET) sheet, a polyimide sheet, a polyaryletheretherketone (PEEK) sheet, or a nylon sheet. It likewise has fiducial apertures 711. However, unlike the array 200, the conductors 712 of the array 700 are not located on the front surface 703 of the support 704.

Figure 9:
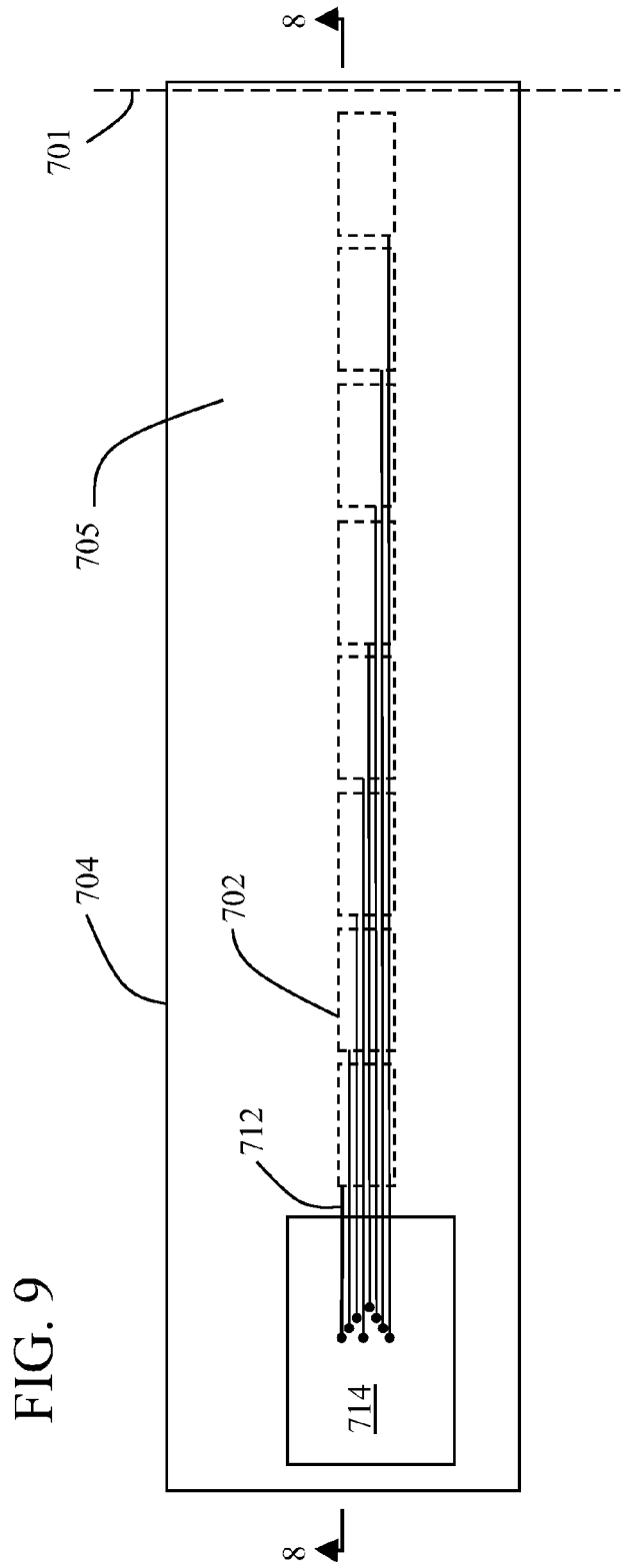
FIG. 9 is a close-up view of the distal surface of the inorganic photodetector detector array 700.

Rather, as schematically illustrated in FIGS. 8 and 9, the conductors 712 are located on the distal surface 705 of the support 704 opposite the front surface 703, and are connected to respective photodetectors 702 through holes 720 in the support 704. This construction is advantageous due to space limitations on the front surface 703 of the support 704, resulting from the number of photodetectors 702 located thereon. Because the distal surface 705 of the support 704 is free of any photodetectors 702, there is much more space available in which to place the conductors 712 than on the front surface 703.

The holes 720 may be made in the support 704 using the focussed beam of a continuous wave or a pulsed laser such as a 10.6 μm carbon dioxide ($CO_2$) laser or a 1.06 μm Nd-YAG laser. If a CW laser is used it is preferable to use nitrogen blanketing. The conductor 712 coating the relevant regions of the distal surface 705 of the support 704 is preferably a bright metal or other good reflector of the laser beam, and arrests its further penetration. After the holes 720 are formed, they can be filled with micro-drops of conductive adhesive 722 from the front surface 703 to complete the connection to the conductor 712 on the distal surface 705. Preferably, a flexible resin is employed to permit bending at a later stage without damage.

The conductors 712 may be formed on the distal surface 705 of the support 704 (which may be a non-absorbing glossy plastic) using conventional ink jet printing technology. A representative example of such technology is disclosed in U.S. Pat. No. 5,933,168, incorporated herein by reference for its disclosure of ink jet printing technology, which states droplets of 5 to 7 nanograms were produced. To adapt the teachings of that patent, or other conventional ink jet printing technology, it is desirable to choose a material for the photodetector 702 material and/or the conductor 712 and 722 material which matches the fluidic parameters of the ink fluid used. Ideally, these include the ratio of density to volume compressibility, kinematic viscosity, contact angle, and surface tension. It may be useful to select a rubber diaphragm resistant to the materials being printed. It is believed that ink jet printing is able to achieve a space between adjacent parallel conductors 712 of down to approximately 16 μm, which corresponds to a 32 μm pitch and a density of more than 30 conductors per millimeter.

In this way, as suggested in FIGS. 8 and 9, separate and densely spaced electrical conductors 712 lead from each inorganic photodetector 702 to a side of the array 700. The conductors 712 thus connect the inorganic photodetectors 702 to "active" electronic components 714 mounted at each side of the array 700, such as for example amplifiers, analog-to-digital convertors, multiplexers, application-specific integrated circuits (ASICs), and the like, together with output connectors. The electronic components 714 may be formed in approximately 5 cm wide margins along the sides, and may appear on either the front surface 703 or the distal surface 705 of the support 704. In this way, the conductors 712 may carry power to, and also carry output signals from, each inorganic photodetector 702. Also, one electrode of each inorganic photodetector 702 is connected to a common ground, such as through a transparent conducting layer disposed above the photodetectors 702.

The inorganic photodetectors 702 of the exemplary array 700 are direct detectors; that is, they directly harness incoming x-rays and produce an electrical signal indicative of the incoming x-rays. In alterative embodiments, the photodetectors may be indirect detectors; in those embodiments, scintillator elements are disposed on top of the photodetectors to convert incoming x-rays to another form of light, and that second form of light is then harnessed by the photodetectors to indirectly produce an electrical signal indicative of the incoming x-rays.

Figure 7A:
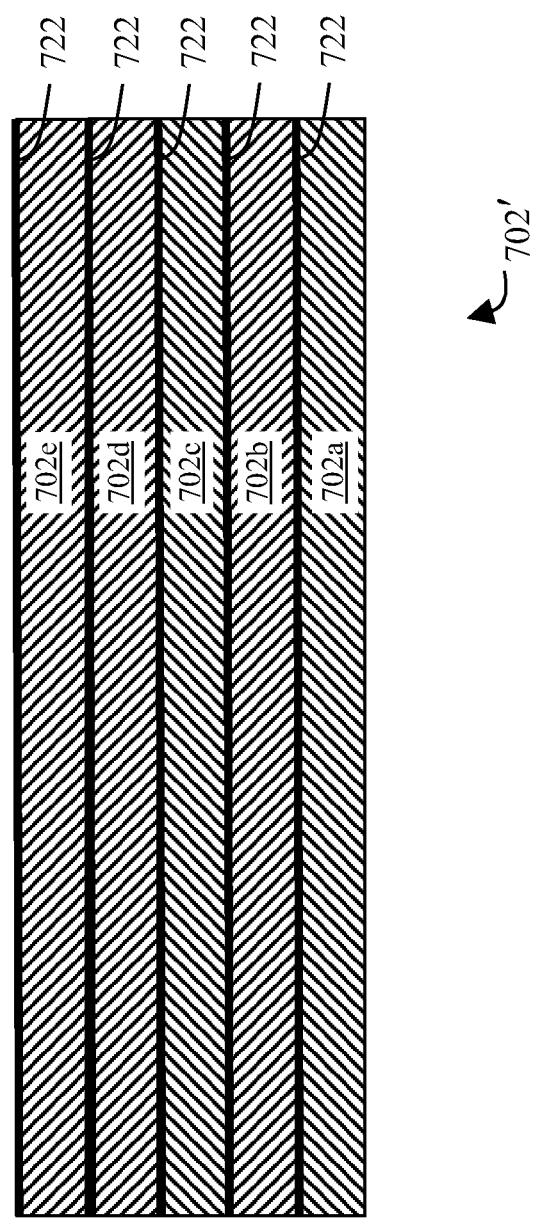
FIG. 7A is a view of a laminated photodetector.

In an alternative embodiment shown in FIG. 7A, the photodetectors 702 may be formed by several stacked layers, such as five layers 702a through 702e shown in FIG. 7A. In such embodiments, each layer of the laminated photodetector 702' is first separately formed by disposing an inorganic material which is preferably at least about 100 μm thick on a support, and then curing it to form a semiconductor layer. The semiconductor layers 702a through 702e are then stacked and laminated to form a thick semiconductor photodetector array 702'. In this laminated stack 702', the direct conversion photodetector layers 702*a* through 702*e* lie exactly against each other with no intervening elements.

The thick semiconductor array 702' is next disposed on a base support, such as the support 704, with each direct conversion photodetector layer 702*a* through 702*e* connected in parallel to the corresponding layer underneath it by a common adhesive bond 722. In this way the conductive adhesive 722 links the stacked photodetector array 702' to form a single dixel. Each dixel is connected by electrical conductors 712 to "active" electronic components 714 to process the signal from the thick stacked semiconductor 702'.

Once the inorganic photodetector detector array 700 has been assembled, it may be inserted into a cradle 118 for use as a data measurement system 114 in a CT imaging apparatus such as the apparatus 100 described above. This process is substantially as shown and described above in connection with the inorganic photodetector detector array 200, including use of fiducial pins 504.

Figure 10:
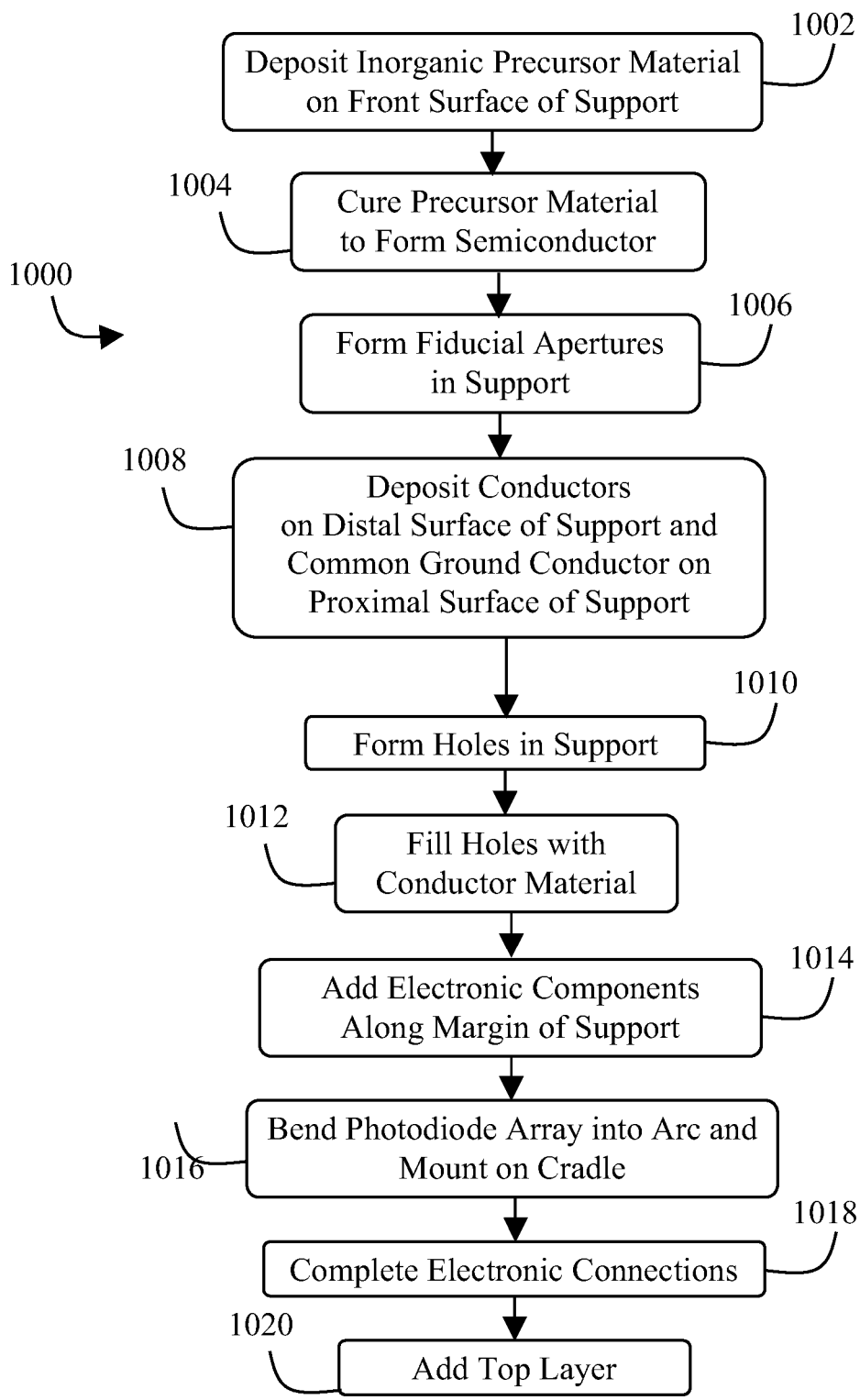
FIG. 10 illustrates a process 1000 of manufacturing and assembling the inorganic photodetector detector array 700.

An inorganic photodetector detector array 700 may be manufactured and assembled within a data measurement system according to the process 1000 illustrated in FIG. 10. The ordering of the steps of the process 1000 as shown in FIG. 10 may be changed to suit the needs of a particular application, and some steps may be added or removed from the exemplary process 1000 shown and described here.

The inorganic precursor material is first deposited 1002 on a front surface 703 of the support 704 in a photodetector 702 array 700. This deposition may be achieved, for example, by a printing process whereby the inorganic material making up the photodetectors 702 is printed on to the support 704, as already described. Depending on the size and application of the photodetector array 700, suitable printing processes might include roll-to-roll printing, silk-screen printing, spin coating printing, and ink jet printing. The inorganic material may also be deposited from solution and photo-etched to form patterns.

The array 700 is then heated and cured 1004 to form a thin but dense film of semiconductor.

Fiducial apertures 211 are formed 1006 in the support 204.

Electrical conductors 712 are deposited 1008 on the distal surface 705 of the support 704, with one conductor 712 leading from each inorganic photodetector 702 to a side of the array 700. The conductors 712, like the photodetectors 702 themselves, may be added with a printing process. Holes 720 are formed 1010 in the support 704, and filled 1012 with a conductor such as a flexible conductive epoxy resin 722 to connect each inorganic photodetector 702 to an associated conductor 712. One electrode of each inorganic photodetector 702 is connected to a common ground, such as through a conducting layer disposed above the photodetectors 702. The layer may but need not be transparent, and it may be cast or printed, with perforations to prevent short-circuiting the conductors of the other electrodes which pass through it. Associated "active" electronic components 714 are added 1014 at each side of the inorganic photodetector detector array 700, such as for example amplifiers, analog-to-digital convertors, multiplexers, application-specific integrated circuits (ASICs), and the like, together with output connectors.

The inorganic photodetector detector array 700 is bent 1016 into an arc, to conform to the radius of a rigid cradle 118 centered on an x-ray source 110. The bent array 700 is mounted 1016 to the cradle, such as with fiducial pins 504, and/or adhesive, or any other means to achieve the precise positioning required to properly focus the photodetectors 702 on the x-ray source 110.

The electronic connections are completed 1018, and any further electronic components required to complete the assembly of the data measurement system are added. A layer 506 of white plastic, such as polytetrafluoroethylene (PTFE) loaded with $TiO_2$, may be added 1020 over the inside surface of the arc formed by the array 700. This layer 506 adds strength to the array 700, and forms a seal against humidity.

In this example, the inorganic photodetector array 700 is a sixteen slice array, with eight slices or rows 708 appearing on each side of the centerline 701 of the array 700. It is believed that present printing technology has an upper pitch limit of 32 conductors per millimeter. Applying that upper limit, and assuming a photodetector 702 dixel pitch of 1 mm, the design of the array 700 may be directly applied to make an array with thirty-two slices on each side of a centerline 701, for a total of sixty-four slices. Of course, if higher pitch printing methods are found or known, the number of available slices will correspondingly increase. Alternatively, if a lower spatial resolution of the imaging process is acceptable, the photodetector 702 dixel pitch may be reduced, providing more room in which to place the conductors 712 and so increase the number of slices.

Figure 11:
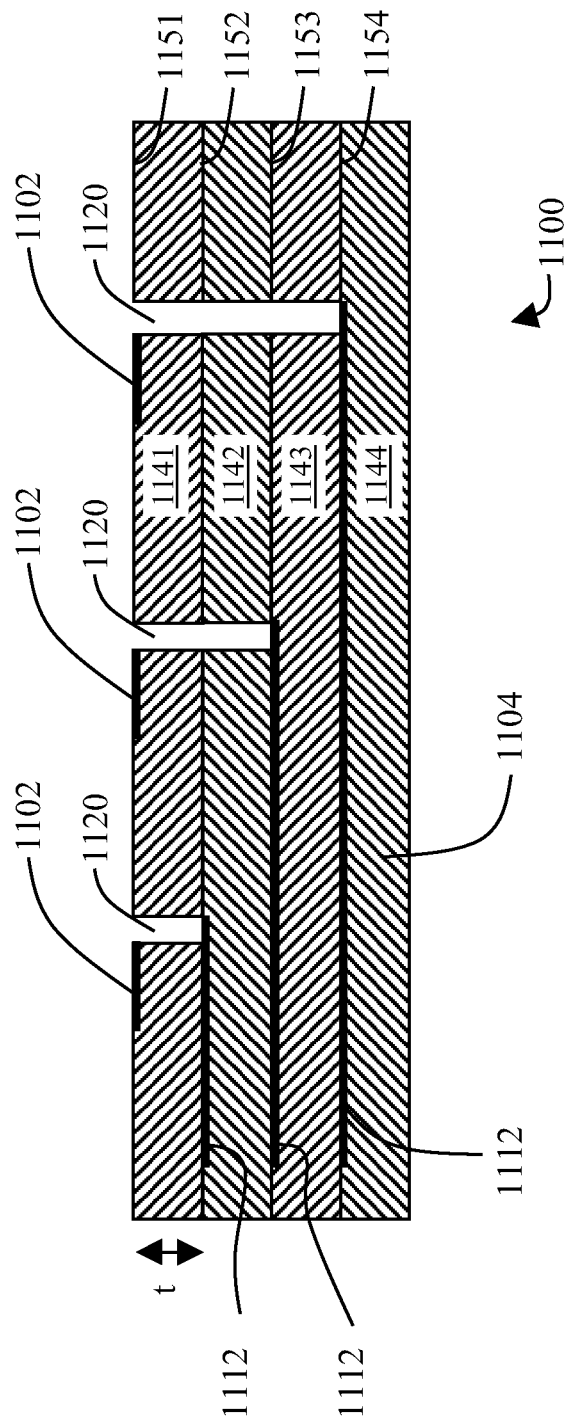
FIG. 11 is a cross-sectional view of an inorganic photodetector detector array 1100 having more than one layer.

In yet another embodiment, illustrated in FIG. 11, a method is provided to increase the number of imaging slices to be made with a photodetector array 1100. In this embodiment, the support 1104 has multiple layers. Four layers 1141, 1142, 1143 and 1144 are shown in FIG. 11 as a representative example. Each of the layers 1141, 1142, 1143 and 1144 is preferably a stable yet bendable plastic sheet, such as for example a polyethylene terephthalate (PET) sheet, a polyimide sheet, a polyaryletheretherketone (PEEK) sheet, or a nylon sheet. The thickness t of an individual layer may be approximately 10 µm to 100 µm. The inorganic photodetectors 1102 are disposed on the front surface 1151 of the top layer 1141.

To assemble the multi-layer macro inorganic photodetector array 1100, each layer 1141, 1142, 1143 and 1144 is printed with an appropriate network of conductors 1112 on its respective front surface 1151, 1152, 1153 or 1154. The layers 1141, 1142, 1143 and 1144 are glued together with a flexible adhesive to form the support 1104. Holes 1120 are formed in the support 1104, providing a communication path between each conductor 1112 and a corresponding inorganic photodetector 1102 on the top surface 1151. The holes 1120 may be made in the support 1104 using the focussed beam of a continuous wave or a pulsed laser, such as a 10.6 µm carbon dioxide ($CO_2$) laser or a 1.06 µm Nd-YAG laser. If a CW laser is used it is preferable to use nitrogen blanketing. The conductors 1112 are preferably a bright metal or other good reflector of the laser beam, to help protect deeper layers in the support 1104 from laser beam damage during formation of a hole 1120. Thus a conductor 1112 forms the base of each hole 1120. Control of the laser beam intensity and exposure time can ensure that the laser beam penetrates the multilayer support 1104 only as far as the reflective metal layer 1112 and no further. After the holes 1120 are formed, they can be filled with conductive adhesive (not shown) extending from the photodetector surface 1151 to the bottom of the hole 1120, to complete the connection to each conductor 1112.

Thus, by providing multiple layers of pathways, the available space in the array 1100 for the conductors 1112 is greatly increased. This allows more imaging slices to be formed in the array, without sacrificing the quality of images obtained using the array. This method may be used in conjunction with a laminated photodetector, as described above.

Spectral CT Scanners

Figure 12:
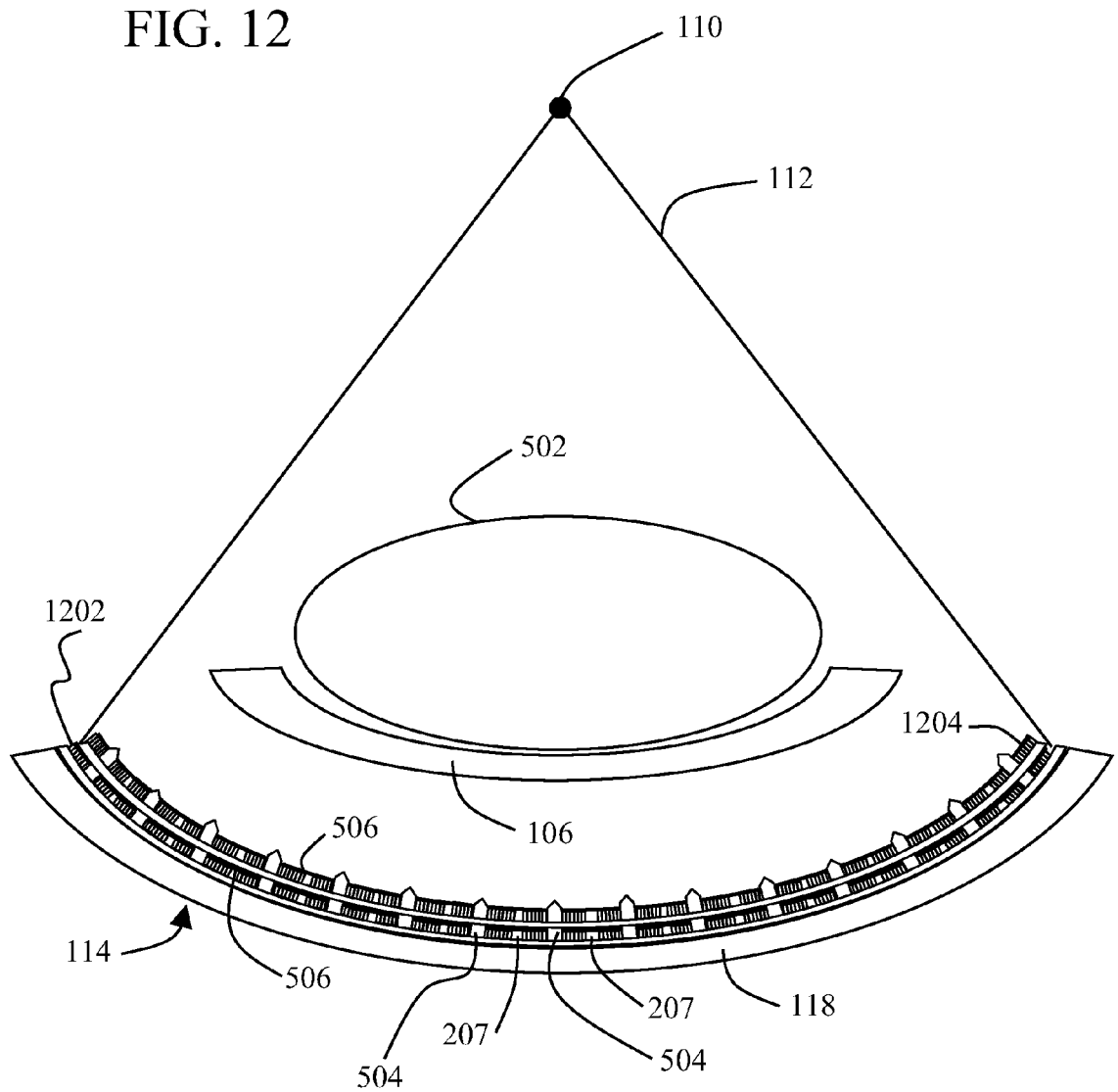
FIG. 12 is a schematic transaxial view of a spectral CT imaging system.

The concepts discussed above can be readily applied to a spectral CT apparatus. For spectral CT, the data measurement system 114 combines two separate inorganic photodetector detector arrays together, as shown for example in FIG. 12 as a bottom inorganic photodetector detector array 1202 and a top inorganic photodetector detector array 1204. The top array 1204 is preferentially responsive to the low-energy (softer) incident x-rays, which it filters out, leaving only the high energy (hard) x-rays to which the bottom array 1202 is preferentially sensitive. This improves statistics in photon energy spectrometry.

The bottom inorganic photodetector detector array 1202 may be identical to the inorganic photodetector detector array 200 (for up to a four slice spectral CT scanner), the inorganic photodetector detector array 700 (for up to a sixty-four slice spectral CT scanner), or the inorganic photodetector detector array 1100 (for a greater than sixty-four slice spectral CT scanner). However, the bottom inorganic photodetector detector array 1202 may preferably incorporate for example $AuInGaSe_2$ or $AuInThSe_2$, which are relatively dense inorganic semiconductor materials. There may be standard fiducial hole spacing for the fiducial pins 504.

The top inorganic photodetector detector array 1204 is added in order to provide spectral CT imaging capability. There are two principal differences in the design of the top array 1204 versus the bottom array 1202. First, the top array 1204 is a lower energy array, responding preferentially to softer x-rays, and thus including for example CIGS as an inorganic semiconductor material. Second, in comparison with the components of the bottom inorganic photodetector detector array 1202, the photodetectors of the top inorganic photodetector detector array 1204 are printed to be slightly smaller in size, with slightly smaller separations, and with fiducial hole spacing slightly reduced. This permits the top detector array 1204 to be mounted on the bottom detector array 1202 in the cradle 118, and yet still be focused on the x-ray source 110 at the correspondingly slightly smaller radius. It also permits the top detector array 1204 to be mounted within the data measurement system 114 using the same fiducial pins 504 as the bottom detector array 1202, for precise positioning. Separate top layers 506 may be used with each detector array 1202 and 1204.

Fourth Generation CT Scanners

Figure 13:
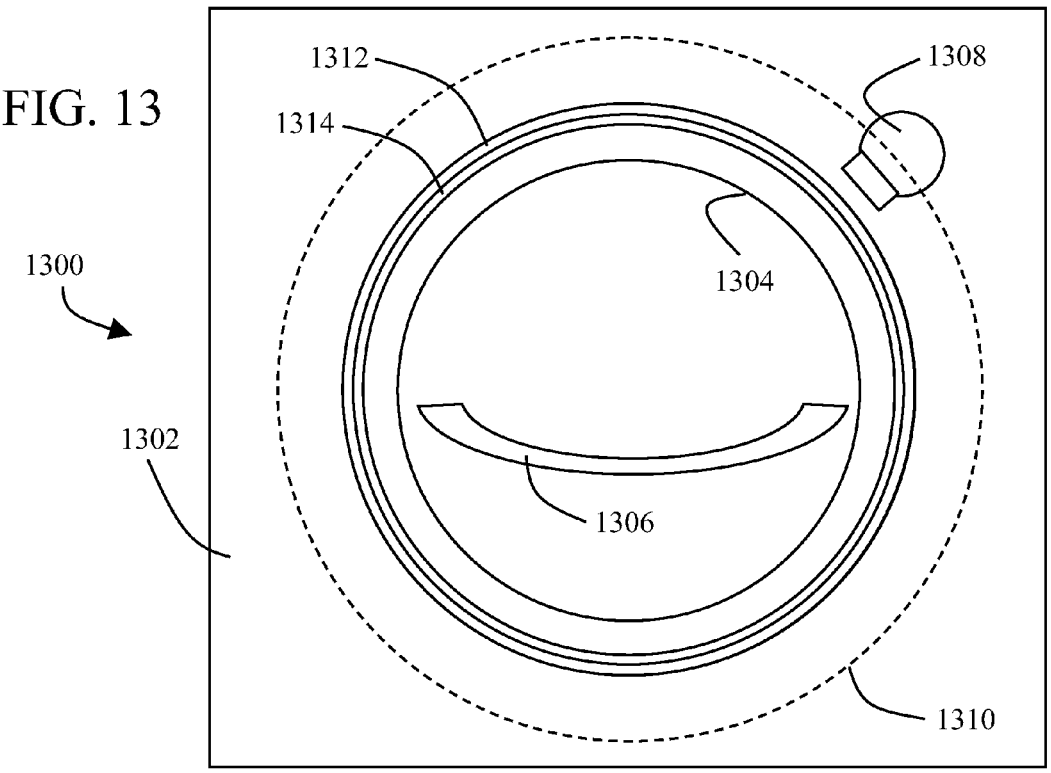
FIGS. 13 and 14 are respectively a schematic front view and a schematic sectional side view of a fourth generation CT imaging apparatus 1300.
Figure 14:
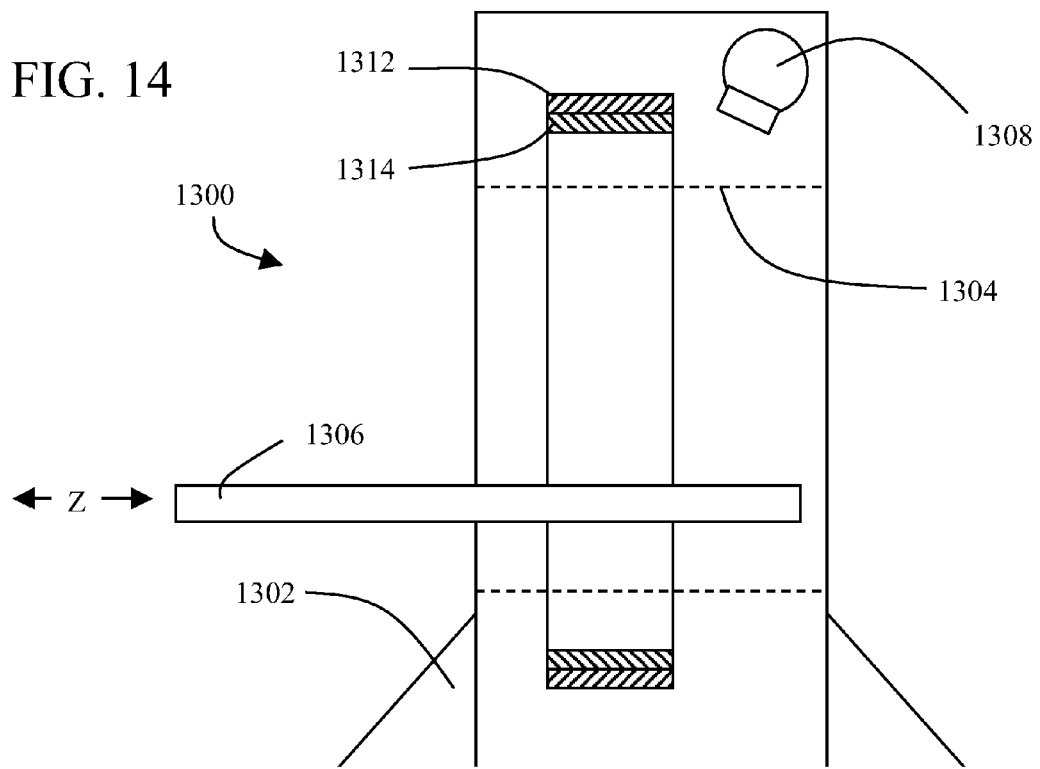

The technology described herein may also be used in connection with fourth-generation CT scanners, such as the apparatus 1300 shown in FIGS. 13 and 14. In a fourth generation CT imaging apparatus, the data measurement system comprises a complete ring of x-ray detectors surrounding the region of interest to be imaged. An offset rotating x-ray source emits x-rays which are received by the detectors, which remain stationary.

Thus, referring to FIGS. 13 and 14, a fourth generation CT imaging apparatus 1300 has a fixed gantry 1302 with an aperture 1304 to receive a table 1306 which linearly moves along the z axis, in and out of the aperture 1304. A patient or other object to be imaged by the fourth generation CT apparatus 1300 is disposed on top of the table 1306. An offset x-ray source 1308 rotates around the region of interest, along a circular path 1310. At least a first ring disposed within the gantry 1302 comprises an inorganic photodetector detector array 1312, as discussed above. More particularly, the support elements 204, 704 and 1104 of the embodiments respectively described above could have a length L equal to the inner circumference of a ring-shaped cradle (not shown) within the gantry 1302. In that way the array 200, 700 or 110 may be mounted on the inside circumference of the ring cradle, using adhesive and/or fiducial aperture-pin arrangements. In other words, in a fourth generation CT apparatus 1300, the fixed ring cradle takes the place of the rotating cradle 118 of the arrays 200, 700 and 1100 described above. The ring cradle may be in the form of an entire ring, or only segments of a complete ring.

Although not shown in FIGS. 13 and 14, the fourth generation CT apparatus 1300 incorporates a processing and display system analogous to the system 120 already discussed in connection with the third generation CT imaging apparatus 100.

Spectral CT capability may also be added to the fourth generation CT apparatus 1300, by adding a second ring-shaped inorganic photodetector detector array 1314 inside the first ring-shaped inorganic photodetector detector array 1312. Thus, in this spectral CT embodiment, the first inorganic photodetector detector array 1312 incorporates a relatively more dense semiconductor such as $AuInGaSe_2$ or $AuInThSe_2$, while the second inorganic photodetector detector array 1314 incorporates a relatively less dense semiconductor such as CIGS. Also, in comparison with the components of the first inorganic photodetector detector array 1312, the photodetectors of the second inorganic photodetector detector array 1314 are slightly smaller in size, with slightly smaller separations, and with fiducial hole spacing slightly reduced. This permits the second inorganic photodetector detector array 1314 to be mounted within the circumference of the first inorganic photodetector detector array 1312 on the ring-shaped support. It also permits the second inorganic photodetector detector array 1314 to be mounted using the same fiducial pins as the first inorganic photodetector detector array 1312, for precise positioning. More array layers may additionally be used.

The inorganic photodetector detector arrays as described herein are particularly well suited to a fourth generation CT imaging apparatus 1300. The inorganic photodetector detector array are much less costly to produce and install than the ceramic scintillators and silicon photodetectors used in present CT imaging apparatuses. The electronic connectivity costs are also substantially reduced. Thus the cost savings realized in producing enough detectors to completely surround the region of interest can be substantial. Moreover, the requirements for uniformity and temporal stability in the data measurement system are much reduced in fourth generation CT, because the sensitivity, dark noise and linearity of each detector can all be calibrated immediately prior to each imaging exposure. And, only the x-ray source 1308 is required to rotate in the fourth generation CT apparatus 1300, so the gantry mechanical costs can be reduced because a lower mechanical precision is required.

Variable Size Photodetector Dixel Geometries

The dixels 215 of the exemplary inorganic photodetector detector array 200, the dixels 715 of the exemplary inorganic photodetector detector array 700, and the dixels of the exemplary inorganic photodetector detector array 1100 all are shown and described as having the same rectangular shape as shown in the Figures. In at least one alternative embodiment, however, the size of the dixels may advantageously vary within the overall array 200, 700 or 1100, such as shown for example in FIG. 15.

FIG. 15 illustrates an inorganic photodetector array 1500 having a first centerline 1501 which is transverse to the z-axis and a second centerline 1505 which is parallel to the z-axis. The photodetector array 1500 comprises several photodetector dixels 1515 of various sizes disposed on a support 1504. The dixels 1515 are arranged in rows and columns. FIG. 15 illustrates only the six rows 1508a through 1508f and the five columns 1510a through 1510e which are closest to the center of the array, where the centerlines 1501 and 1505 cross. As can be seen, as the dixels 1515 get nearer to one of the centerlines 1501 or 1505 of the array 1500, they decrease in size. This geometry presents a cost effective way to increase the spatial resolution of the detector array 1500 near its center, where objects are typically imaged such as shown for example in FIG. 5 with respect to the array 200.

Persons of ordinary skill in the x-ray detector art will understand that patient dose efficiency can be greatly improved by concentrating dose on the central rays of the x-ray beam, and employing detectors in that region with maximal resolution. Thus, the embodiment of FIG. 15 can also lead to a reduction in required x-ray exposure if the dixel 1515 geometry is coordinated with the specific characteristics of the x-ray source. Specifically, the bow tie x-ray filter (not shown in FIG. 15) can be made much thinner at the edges of the detectors 1515 at the edges of the array 1500 are larger.

Composite Scintillators

The embodiments described above have incorporated inorganic photodetector arrays for directly converting incoming x-rays to an electronic signal. However, such inorganic photodetector arrays may also be used for indirect photoelectric conversion, as a photodiode in conjunction with an intermediate scintillator to form a photodetector. As one alternative of such an indirect conversion, composite scintillators such as described in U.S. Patent Application No. 61/087,195 (filed Aug. 8, 2008) and PCT Patent Application No. PCT/IB 2008/055276 (filed Dec. 12, 2008 and claiming priority to U.S. Patent Application No. 61/087,195 filed Dec. 21, 2007) can be used. Those applications are hereby expressly incorporated by reference herein for their disclosure of composite scintillators.

Such composite scintillators can achieve savings in cost and improved thermal stress performance. In particular, developing a commercially viable printing process for making inorganic semiconductors having the needed purity, quality, speed, linearity and uniformity for direct conversion might be fraught with difficulty. So, as one alternative, one might coat large area photodiode arrays (either organic or inorganic) with a layer of a composite scintillator to improve x-ray detection performance.

Thus FIG. 16 illustrates a process 1600 of manufacturing and assembling a data measurement system including an inorganic or organic photodiode array with composite scintillators. The ordering of the steps of the process 1600 as shown in FIG. 16 may be changed to suit the needs of a particular application, and some steps may be added or removed from the exemplary process 1600 shown and described here.

The photodiodes are deposited 1602 on the front face of a support, as described above. This deposition may be achieved, for example, by a printing process whereby the material making up the photodiodes, such as CIGS, AuInGaSe$_2$, or AuInThSe$_2$, is printed on to the support. Depending on the size and application of the photodiode array, suitable printing processes might include roll-to-roll printing either by vacuum deposition or preferably at atmospheric pressure, silk-screen printing, spin coating printing, and ink jet printing. The photodiode material may also be deposited from solution and photo-etched to form patterns. Fiducial apertures are formed 1604 in the support, and conductor holes are also formed 1606 in the support. Electrical conductors are deposited 1608 on the distal surface of the support, with one conductor leading from each photodiode to a side of the array. The conductors, like the photodiodes themselves, may be added using a printing process applied to the support. One electrode of each photodiode is connected to a common ground, such as through a transparent conducting layer disposed proximally above the photodiodes.

A thin composite scintillator block is then cast 1610 over the front face of the support, for example by dispersing scintillator powder in a suitable resin or plastic, and cured 1612. A wide range of scintillator materials may be used, including GOS, garnets (such as GGAG), ZnSe, ZnS and ZnO powders. These scintillator materials can be inexpensively prepared by wet chemical methods with no need for crystallisation or sintering. Rare earth halides such as $LuI_3$, $YI_3$ or $SrI_2$, which typically give higher light outputs, may be used if care is taken to minimize the presence or formation of moisture.

If the composite scintillator is thin, then little light will be lost by scattering or self-absorption in the scintillator layer and the geometric optical efficiency will be very high. Thus, the thickness of the composite scintillator coating is preferably between approximately 100 to 250 μm. Alternatively or in addition, the powder component of the composite scintillator can be nano-particulate or be of relatively low concentration. This ensures that the self-absorption in the composite scintillator coating layer is tolerable, and that the light output is not too seriously reduced by scattering, in spite of substantial mismatch ($\delta n=0.2$) between the refractive indices of the powder and the resin in the composite. Low-index scintillators such as $LuPO_4$ or $BaF_2$, with a better match to the refractive index of the resin can permit thicker layers.

The composite scintillator coating may be deposited on the photodiode array in any number of ways. In a first way, a continuous film of composite scintillator material is deposited with an optical absorber or dye that absorbs light at the emission wavelength to reduce lateral cross-talk in the composite scintillator.

In a second way, the composite scintillator coating may be scribed such as mechanically or with a laser to form dixels, each juxtaposed upon a corresponding photodiode element of the array, and separated by air gaps or paint to inhibit cross-talk. Thus, a series of parallel slots are cut 1614 in the scintillator block, corresponding to borders between adjacent photodiodes underneath the scintillator block. In this way, elongated slices are formed in the scintillator block. A white reflector is coated within the slots between the slices, and on the edge faces, of the scintillator block and cured 1616. Another series of cuts are made 1618 to the scintillator block, to form slots perpendicular to the previous cuts 1614, so that the combined slot pattern forms dixels in combination with the photodiodes underneath the scintillator block. A white reflector is coated within the new slots, and on the edge faces, of the scintillator block and cured 1620. If desired, some of the slots may be widened 1622 to form modules, so that the array may more easily be bent into a curved configuration.

In a third way of depositing a scintillator coating on a photodiode array to form photodetectors, individual composite scintillator elements are printed directly onto each photodiode by suitable printing processes, with black absorbing ink added in the interstices between composite scintillator elements to prevent cross-talk between them.

In a fourth way of disposing a scintillator coating on a photodiode array for form photodetectors, a commercial x-ray image-intensifying screen is employed. This is applied to the front face of the photodiode arrays using optical cement. A series of parallel slots are cut 1614 in the intensifying screen, corresponding to borders between adjacent photodiode underneath the screen, to form elongated slices as in the cast composite scintillator block.

Conductive adhesive is placed 1624 within the conductor holes of the support, in order to electrically connect the inorganic photodiodes on the front surface of the support to the conductors on the distal surface of the support. Associated "active" electronic components are mounted 1626 at each side of the array, such as for example amplifiers, analog-to-digital convertors, multiplexers, application-specific integrated circuits (ASICs), and the like, together with output connectors. An anti-scatter grid may also be added 1626 to the array. Then the data measurement system is bent into an arc and placed within a cradle, by positioning the fiducial apertures of the support over fiducial pins in the cradle to properly focus on an x-ray source. Using an appropriate geometry, this process may be used for third or fourth generation data measurement systems.

These combined composite scintillator/inorganic photodiode arrays can achieve adequate x-ray stopping power in any one of several ways. In a first embodiment, several layers of composite scintillator/inorganic photodiodes can be laminated to form a thick detector laminate, such as shown in FIG. 17. Shown therein is a three-layer laminate 1700 of composite scintillator/inorganic photodiode arrays held together and aligned by fiducial pins 504. In such a multi-layer laminate, commercial x-ray intensifying screens may b used to form the composite scintillator in the laminations. In a similar manner, multi-layer laminates of combined composite scintillator/photodiode array layers may be incorporated into a fourth generation CT imaging apparatus, wherein each layer is in the shape of a complete ring. Such laminates could also suitably be used in a spectral CT apparatus, by separately reading out the photodiode arrays in the integrating mode.

In a second embodiment, a detector array 1800 is made by combining together several sectorial-shaped elements 1801 in a stacked relationship, wherein each element 1801 corresponds to a single imaging slice of the array 1800. As shown in FIG. 18, each slice array element 1801 includes several organic or inorganic photodiodes 1802 and corresponding composite scintillators 1803 deposited on a first side 1805 of a support 1804, perhaps in groups 1806, to form photodetectors. For ease of illustration, the individual photodiodes 1802 and scintillators 1803 of only one group 1806 are shown in FIG. 18. The photodiodes 1802 and composite scintillators 1803 as shown in the Figure are sectorial in shape, although any shape may be used. The cross-sectional size of the top of the composite scintillators 1803 exposed to the incoming radiation R is preferably on the order of approximately 0.5 to 5 mm. The composite scintillators are preferably on the order of approximately 0.5 to 6 mm high, to absorb all the radiation R. Thus, the array 1800 is disposed within a CT imaging apparatus 100 so that the z-axis is oriented as shown in FIG. 19. The thickness t of each photodiode slice 1801 along the z-axis is preferably approximately 100 µm or less, so that little of the emitted optical radiation R is absorbed in the scintillators 1803, and the geometric quantum efficiency (DQDE) is high. The base is preferably slightly thicker than the tip. In an actual slice element 1801, approximately forty-two groups 1806 with approximately sixteen photodetectors 1802 in each group (or six-hundred and seventy-two total photodetectors 1802) for example may span the arc length of the support 1804, although only thirteen groups 1806 are shown in the Figure.

Each photodiode 1802 may be composed of an inorganic material, as already discussed above in connection with the other embodiments herein, or an organic material. The photodiodes 1802 may be deposited on the support 1802, for example, by a printing process. Suitable printing processes include roll-to-roll printing such as by vacuum deposition or preferably at atmospheric pressure, silk-screen printing, and spin coating printing of the photodiodes 1802 at low resolution on the support 1804. For higher spatial resolution, an ink jet printing process may also be employed to deposit the photodetectors 1802 on the support 1804. The material may also be deposited from solution and photo-etched to form patterns.

The support 1804 of the system 1800 is preferably a stable, thin rigid plastic sheet. The support 1804 may be, for example, a polyethylene terephthalate (PET) sheet, a polyimide sheet, a polyaryletheretherketone (PEEK) sheet, or a nylon sheet. The sheet may be for example between about 9 and 30 µm thick. An additional thin metallic support (not shown) may be added to provide further strength and rigidity. The support 1804 likewise has fiducial apertures 1811, like those in other embodiments.

Electrical conductors (not shown in the Figures) lead from each photodiode 1802 to "active" electronic components 1814 mounted on the support 1804. Such components may include for example amplifiers, analog-to-digital convertors, multiplexers, application-specific integrated circuits (ASICs), and the like, together with output connectors. The conductors may be formed using conventional ink jet printing technology or roll-to-roll printing. The conductors may be located on the first surface 1805, which also has the photodetectors 1802. They may alternatively be located on the opposite surface of the support 1804, such as by placing holes through the support 1804 using the focussed beam of a continuous wave or a pulsed laser such as a 10.6 µm carbon dioxide ($CO_2$) laser or a 1.06 µm Nd-YAG laser. Or, several layers of support material 1804 may be used similarly to the embodiment of FIG. 11 in order to make enough room to fit all the conductors. One electrode of each photodetector 1802 is connected to a common ground, such as through a transparent conducting layer disposed above the photodetectors 1802.

As an alternative arrangement not shown in the Figures, each photodetector may be formed by several stacked layers of combined composite scintillator and photodiode material. In such embodiments, each layer of the laminated photodetector is first separately formed by disposing an inorganic material which is preferably at least about 100 µm thick on a support, and then curing it to form a semiconductor layer. The composite scintillators are then added to create indirect photodetectors. The composite scintillator has a thickness on the order of 100 µm, and the photodiode has a thickness on the order of about 10 µm, for a combined thickness of one layer of about 110 µm. About 10 layers stacked together in a laminate then has a thickness on the order of about 1 mm. The layers feed in parallel to a single set of electronics.

Once several slice elements 1801 have been made, a corresponding array 1800 may be assembled by stacking several slice elements 1801 together. This is illustrated in FIG. 19, using four elements 1801 which corresponds to a four slice imaging apparatus 100. Ideally the slices 1801 are slightly tapered, being thicker at the base than at the tip to "focus" them on the x-ray source 110. Fiducial pins may extend through aligning fiducial holes 1811 (FIG. 18) in each slice element 1801, to properly position each element 1801 within the array 1800.

FIG. 20 shows a slice element 2001 suitable for a spectral CT imaging apparatus. Accordingly, the element 2001 corresponds to a single imaging slice, which when stacked with other similar elements 2001 in the manner described in connection with the embodiment of FIGS. 18 and 19 forms a system 2000 (not shown) for imaging. The slice element 2001 includes several photodetectors 2002 and corresponding composite scintillators 2003 deposited on a first side 2005 of a support 2004, perhaps in groups 2006. For ease of illustration, the individual photodetectors 2002 and composite scintillators 2003 of only one group 2006 are shown in FIG. 20. The photodetectors 2002 and composite scintillators 2003 as shown in the Figure are sectorial in shape, although any shape may be used. The cross-sectional size of the scintillators 2003 from the standpoint of the incoming radiation R is preferably on the order of approximately 0.5 to 5 mm by 0.5 to 5 mm, and most preferably approximately 1 mm by 1 mm. The size of the photodetectors 2002, in relation to the size of the other components in the slice element 2001, has been greatly exaggerated in FIG. 20 for purposes of illustration. In an actual slice element 2001, for example approximately forty-two groups 2006 would span the arc length of the support 2004, instead of the thirteen groups 2006 shown in the Figure.

Each of the groups 2006 in a first (remote) array 2012 of photodetectors 2012 incorporates higher energy composite scintillators, while the second (closer) array 2014 incorporates lower energy composite scintillators. Also, in comparison with the components of the first array 2012, the scintillators and photodetectors of the second array 2014 are slightly smaller in size, with slightly smaller separations. This permits the second array 2014 to be mounted above the first array 2012, and still be appropriately focused on the source of the incoming radiation R.

In yet further embodiments, one or more combined composite scintillator/inorganic photodiode layers may be tilted at an angle to the x-ray beam 112 to increase its effective thickness and thus reduce the number of laminations required to absorb the x-rays. A representative array 2100 is shown in FIGS. 21 through 23. As shown in FIG. 21, a support 2101 has photodiodes 2102 printed on it, as described above. A layer of composite scintillator or an x-ray intensifying screen 2150 is then placed on top of the photodetectors 2102. The composite scintillator or image intensifying screen 2150 may be optically coupled to the photodiodes 2102 such as for example by using an optical adhesive. The composite scintillator or screen 2150 is then scribed to form gaps 2170, as shown in FIG. 22. The array is then folded fanwise at the gaps 2170 into a concertina shape, such as shown in FIG. 23, and incorporated into a data measurement system. (The scale as shown in FIGS. 21 and 22 is greatly magnified with respect to the scale of FIG. 23.)

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof. The invention may take form in various components and arrangements of components, and in various steps and arrangements of steps. The drawings are only for purposes of illustrating the preferred embodiments and are not to be construed as limiting the invention.

Having thus described the preferred embodiments, the invention is now claimed to be:

1. An imaging system comprising:
a radiation source which rotates around a central z-axis of the imaging system to perform imaging scans; and
an inorganic photodetector array including several discrete inorganic photodetectors arranged on a curved support, such that each row of inorganic photodetectors is aligned along the curve of the curved support, and each column of inorganic photodetectors is aligned in parallel to the central z-axis of the imaging system, wherein conductor paths are disposed along a distal surface of the curved support which is substantially opposite a surface of the support on which the inorganic photodetectors are disposed, and further comprising holes in the support filled with a conductor material different than the conductor path to electrically connect the conductor paths to the inorganic photodetectors, wherein the conductor paths associated with a column of inorganic photodetectors are located along the distal surface of the support opposite the column of inorganic photodetectors to a side of the inorganic photodetector array.

2. The imaging system of claim 1, wherein the inorganic photodetectors comprise at least one of CIGS, $AuInGaSe_2$, and $AuInThSe_2$.

3. The imaging system of claim 1, wherein the curved support comprises a bendable sheet.

4. The imaging system of claim 3, wherein the bendable sheet comprises a PET sheet, a polyimide sheet, a PEET sheet, or a nylon sheet.

5. The imaging system of claim 1, wherein each row of inorganic photodetectors corresponds to a single imaging slice during imaging scans performed by the imaging system.

6. The imaging system of claim 1, further comprising one or more scintillators disposed between the radiation source and the inorganic photodetectors.

7. The imaging system of claim 6, wherein the scintillators are formed from a composite scintillator material.

8. The imaging system of claim 1, wherein the inorganic photodetectors are disposed on the curved support by a printing process.

9. The imaging system of claim 1, the inorganic photodetectors operatively connectable via said conductor paths to one or more active electronic components disposed on the curved support.

10. The imaging system of claim 9, wherein the curved support is comprised of more than one layer including a top layer and one or more under-layers, the inorganic photodetectors are disposed on the top layer, and each under-layer comprises a top surface which is proximate to the top layer and on which is disposed at least one of the conductor paths.

11. The imaging system of claim 1, wherein the curved support extends around a complete circumference of the central z-axis of the imaging system.

12. The imaging system of claim 1, wherein the inorganic photodetector array comprises two layers of inorganic photodetectors, a first layer associated with one or more high energy inorganic photoelectric materials, and a second layer associated with one or more low energy inorganic photoelectric materials.

13. The imaging system of claim 1, wherein the inorganic photodetector array comprises at least two sectorial-shaped elements in a stacked relationship with each other, with several discrete inorganic photodetectors arranged on the sectorial-shaped elements.

14. The imaging system of claim 1, wherein the inorganic photodetector array comprises a bendable inorganic photodetector array, the array comprising a bendable support, one or more active electronic components disposed on the support, and conductor paths operatively connecting each of the inorganic photodetectors to at least one of the active electronic components.

15. The imaging system of claim 14, wherein the inorganic photodetectors are arranged in rows and columns on the bendable support, each row of inorganic photodetectors corresponds to a single imaging slice during imaging scans performed by an imaging system, and the columns are aligned in parallel to a central z-axis of the imaging system.

16. The imaging system of claim 14, wherein the inorganic photodetectors comprise at least one of CIGS, AuInGaSe$_2$, and AuInThSe$_2$.

17. The imaging system of claim 14, wherein the bendable support comprises a PET sheet, a polyimide sheet, a PEET sheet, or a nylon sheet.

18. The imaging system of claim 14, further comprising composite scintillators disposed on top of the inorganic photodetectors.

19. The imaging system of claim 14, wherein the assembly is mounted on a cradle within an imaging system to form an imaging data measurement system.

20. The imaging system of claim 14, wherein the inorganic photodetectors are disposed on the support by a printing process.

21. The imaging system of claim 14, wherein the conductor paths are disposed on a common surface of the bendable support with the inorganic photodetectors.

22. The imaging system of claim 14, wherein the conductor paths are disposed on a distal surface of the support substantially opposite a surface on which the inorganic photodetectors are disposed, and the support comprises holes filled with a conductor material to electrically connect the conductor paths to the inorganic photodetectors.

23. The imaging system of claim 22, wherein the support is comprised of more than one layer including a top layer and one or more under-layers, the inorganic photodetectors are disposed on the top layer, and each under-layer comprises a top surface which is proximate to the top layer and on which is disposed at least one of the conductor paths.

24. The imaging system of claim 14, wherein the bendable support has a length which is approximately equal to an entire circumference surrounding a central z-axis of the imaging system, for use in a fourth generation imaging system.

25. The imaging system of claim 14, wherein the inorganic photodetector array comprises two layers of inorganic photodetectors, a first layer associated with one or more high energy inorganic photoelectric materials, and a second layer associated with one or more low energy inorganic photoelectric materials.

26. The imaging system of claim 14, further comprising one or more fiducial apertures disposed in the bendable support.

27. The imaging system of claim 1, wherein a plurality of the conductor paths on the distal surface route opposite an area of one inorganic photodetector.

28. The imaging system of claim 27, wherein at least seven conductor paths on the distal surface route opposite the area of one inorganic photodetector.

29. The imaging system of claim 1, further comprising a common ground connected to a plurality of inorganic photodetectors.

30. The imaging system of claim 29, wherein the common ground comprises a conductive layer disposed above the photodetectors.

31. The imaging system of claim 1, wherein a conductor forms a base of each hole.

32. The imaging system of claim 1, wherein the conductor material comprises a conductive adhesive.

33. A method of making an inorganic photodetector array for use in an imaging system, the method comprising:
  disposing several discrete inorganic photodetectors on a front surface of a curved support;
  placing one or more active electronic components on the distal surface of the support;
  forming conductor paths along the distal surface of the support;
  forming holes in the curved support; and
  filling said holes with a conductor material different than the conductor path operatively connecting each of the inorganic photodetectors to at least one of the active electronic components;
  wherein the conductor paths associated with a column of inorganic photodetectors are located along the distal surface of the support opposite the column of inorganic photodetectors.

34. The method of claim 33, wherein the curved support comprises a bendable support.

35. The method of claim 34, further comprising forming one or more composite scintillators into scintillator arrays above the inorganic photodetectors on the support.

36. The method of claim 35, further comprising casting a composite scintillator block over the inorganic photodetectors and curing the composite scintillator block.

37. An imaging system comprising:
  a radiation source which rotates around a central z-axis of the imaging system to perform imaging scans; and
  an inorganic photodetector array including several discrete inorganic photodetectors arranged on a curved support, such that each row of inorganic photodetectors is aligned along the curve of the curved support, and each column of inorganic photodetectors is aligned in parallel to the central z-axis of the imaging system, wherein conductor paths are disposed on a distal surface of the curved support which is substantially opposite a surface of the support on which the inorganic photodetectors are disposed, and further comprising holes in the support filled with a conductor material different than the conductor path to electrically connect the conductor paths to the inorganic photodetectors, wherein the conductor material comprises a conductive adhesive.

* * * * *